(12) United States Patent
Park et al.

(10) Patent No.: US 8,345,340 B2
(45) Date of Patent: Jan. 1, 2013

(54) METHOD OF ADJUSTING A RESONANCE FREQUENCY OF AN OPTICAL SCANNING DEVICE

(75) Inventors: Jaehyuk Park, Tsukuba (JP); Jun Akedo, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 259 days.

(21) Appl. No.: 12/827,849

(22) Filed: Jun. 30, 2010

(65) Prior Publication Data

US 2011/0002022 A1    Jan. 6, 2011

(30) Foreign Application Priority Data

Jul. 1, 2009 (JP) ................................ 2009-156531

(51) Int. Cl.
*G02B 26/08* (2006.01)
(52) U.S. Cl. .................................. 359/224.1; 359/214.1
(58) Field of Classification Search .... 359/223.1–226.1, 359/290, 291, 212.1, 214.1, 871, 872
See application file for complete search history.

(56) References Cited

U.S. PATENT DOCUMENTS

| | | | |
|---|---|---|---|
| 2006/0245023 A1* | 11/2006 | Akedo et al. | ............... 359/223.1 |
| 2010/0014142 A1 | 1/2010 | Akedo et al. | |

FOREIGN PATENT DOCUMENTS

| | | | |
|---|---|---|---|
| JP | 2-75620 | A | 6/1990 |
| JP | 10-104543 | A | 4/1998 |
| JP | 10-197819 | A | 7/1998 |
| JP | 11-52278 | A | 2/1999 |
| JP | 2004-517351 | A | 6/2004 |
| WO | WO 02/37164 | A1 | 5/2002 |
| WO | WO 2008/041585 | A1 | 4/2008 |
| WO | WO 2008/044470 | A | 4/2008 |

OTHER PUBLICATIONS

Japanese Office Action issued on May 10, 2011 in corresponding Japanese patent application No. 2009-156531 (Excerpted English translation is attached).

* cited by examiner

*Primary Examiner* — Euncha Cherry
(74) *Attorney, Agent, or Firm* — Birch, Stewart, Kolasch & Birch, LLP

(57) ABSTRACT

A method of adjusting a resonance frequency in an optical scanning device containing: providing the optical scanning device having a substrate composed of a substrate main body and two cantilever beam portions, a drive source, a mirror portion, and a supporting component for fixing the substrate main body at a fixed end; and reducing an area of the substrate which protrudes from the fixed end to an outside of the supporting component, thereby to increase the resonance frequency; or alternatively, increasing the area of the substrate which protrudes from the fixed end to the outside of the supporting component, thereby to reduce the resonance frequency.

14 Claims, 16 Drawing Sheets a TORSIONAL RESONANCE OF MIRROR PORTION (fm)
b DIVIDED RESONANCE VIBRATION OF FRAME PORTION (fb)

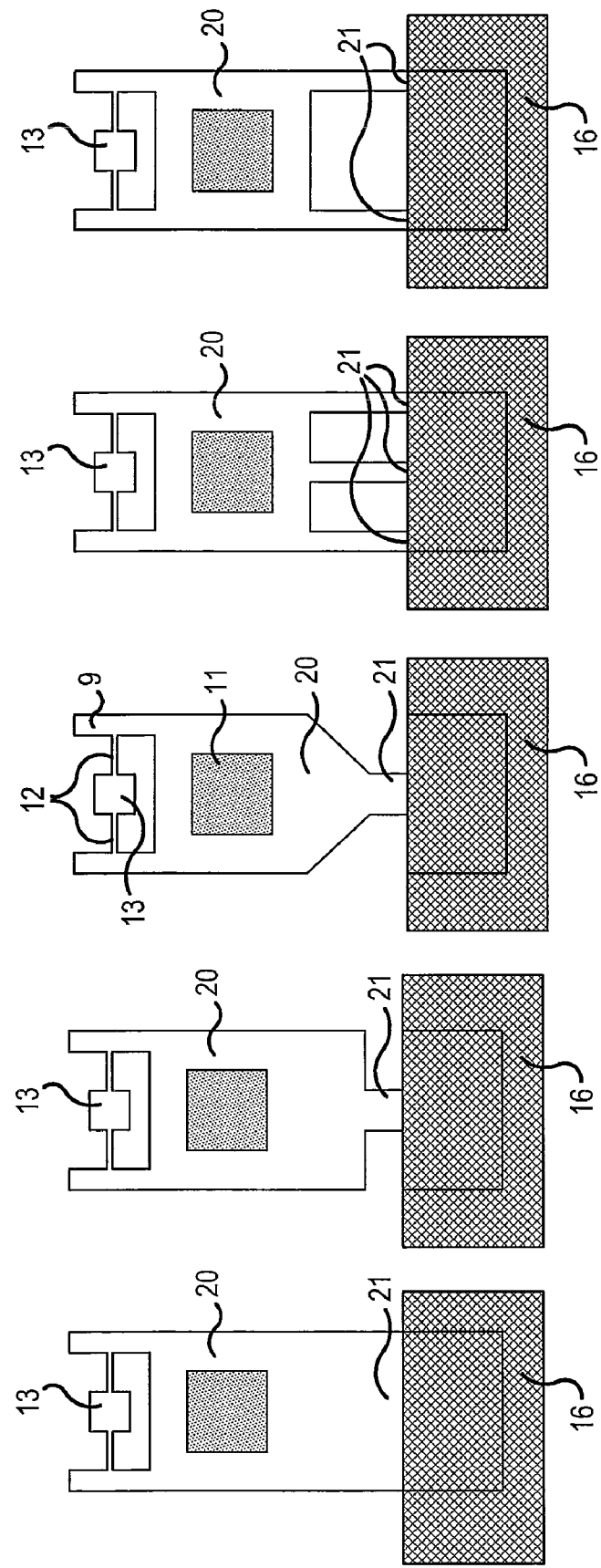

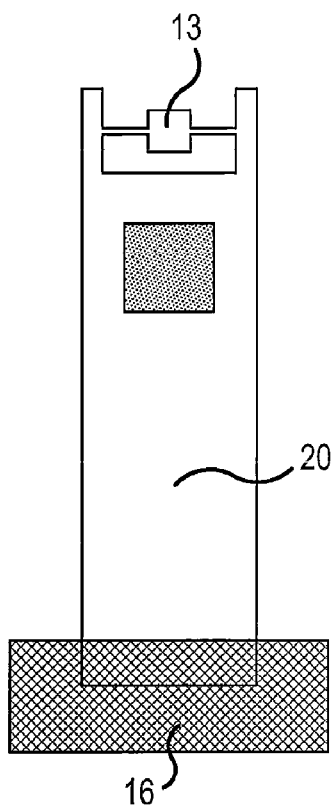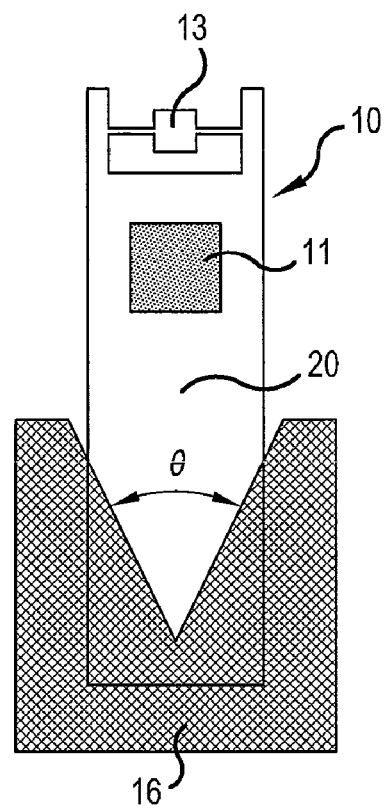
*Fig. 8a*  *Fig. 8b*
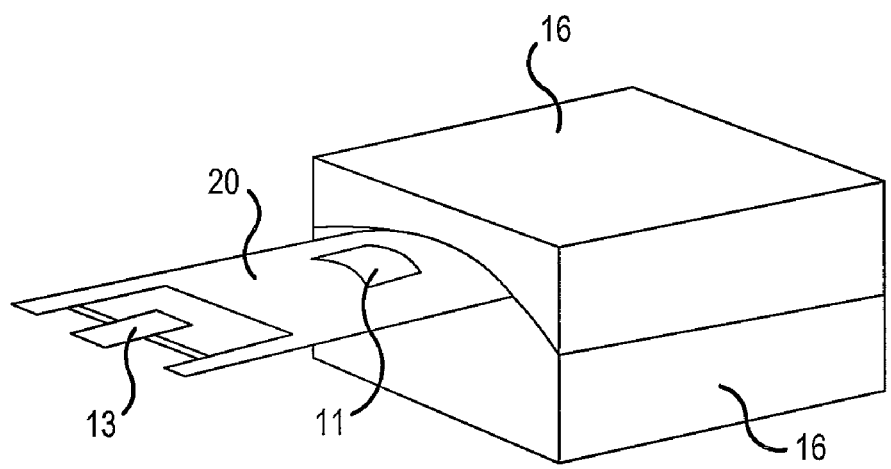
*Fig. 8c*

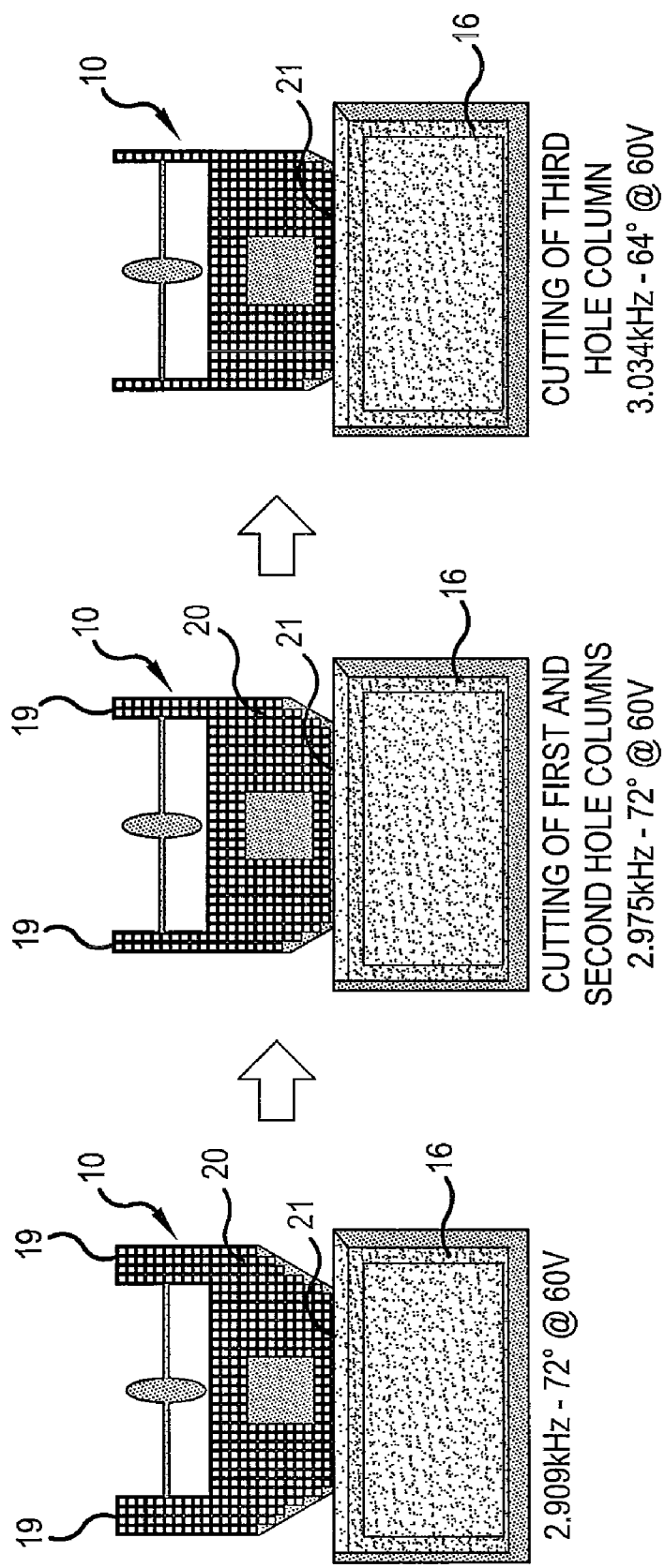

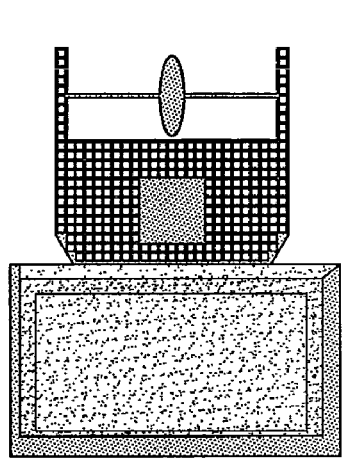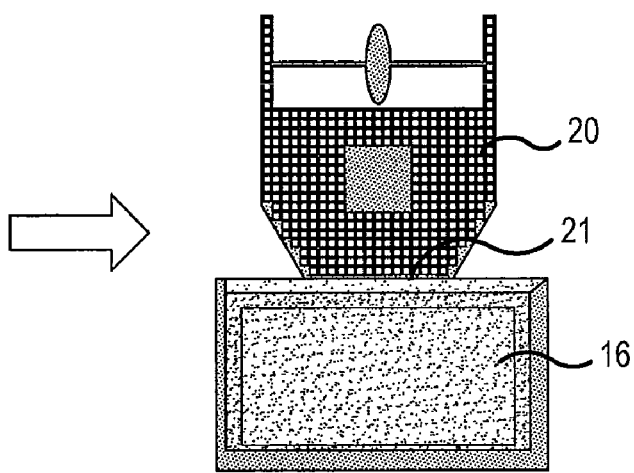
CUTTING OF THIRD
HOLE COLUMN
3.034kHz - 64° @ 60V
Fig. 13a
POSITION OF FIXED END IS
SHIFTED DOWNWARD
2.962kHz - 74° @ 60V
Fig. 13b

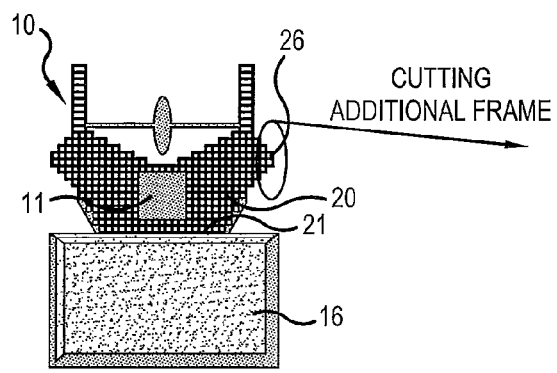
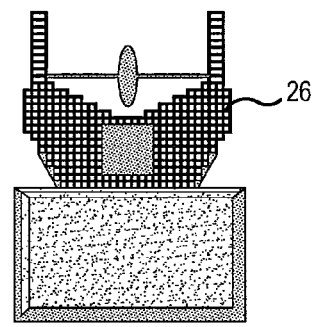
Fig. 14a         Fig. 14b
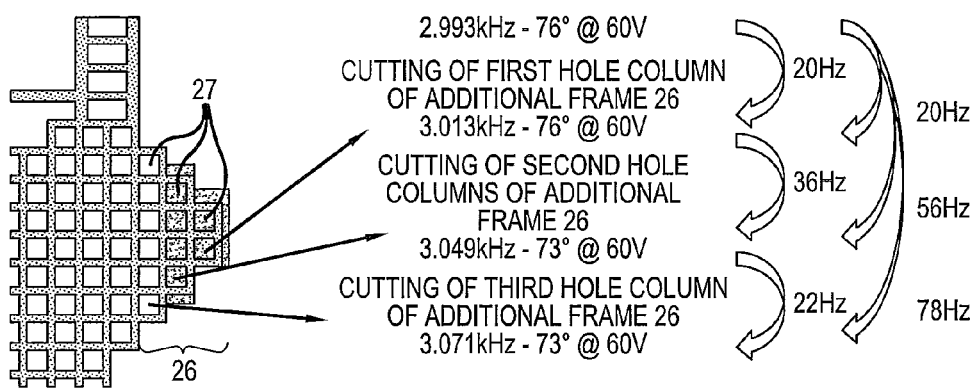
Fig. 14c

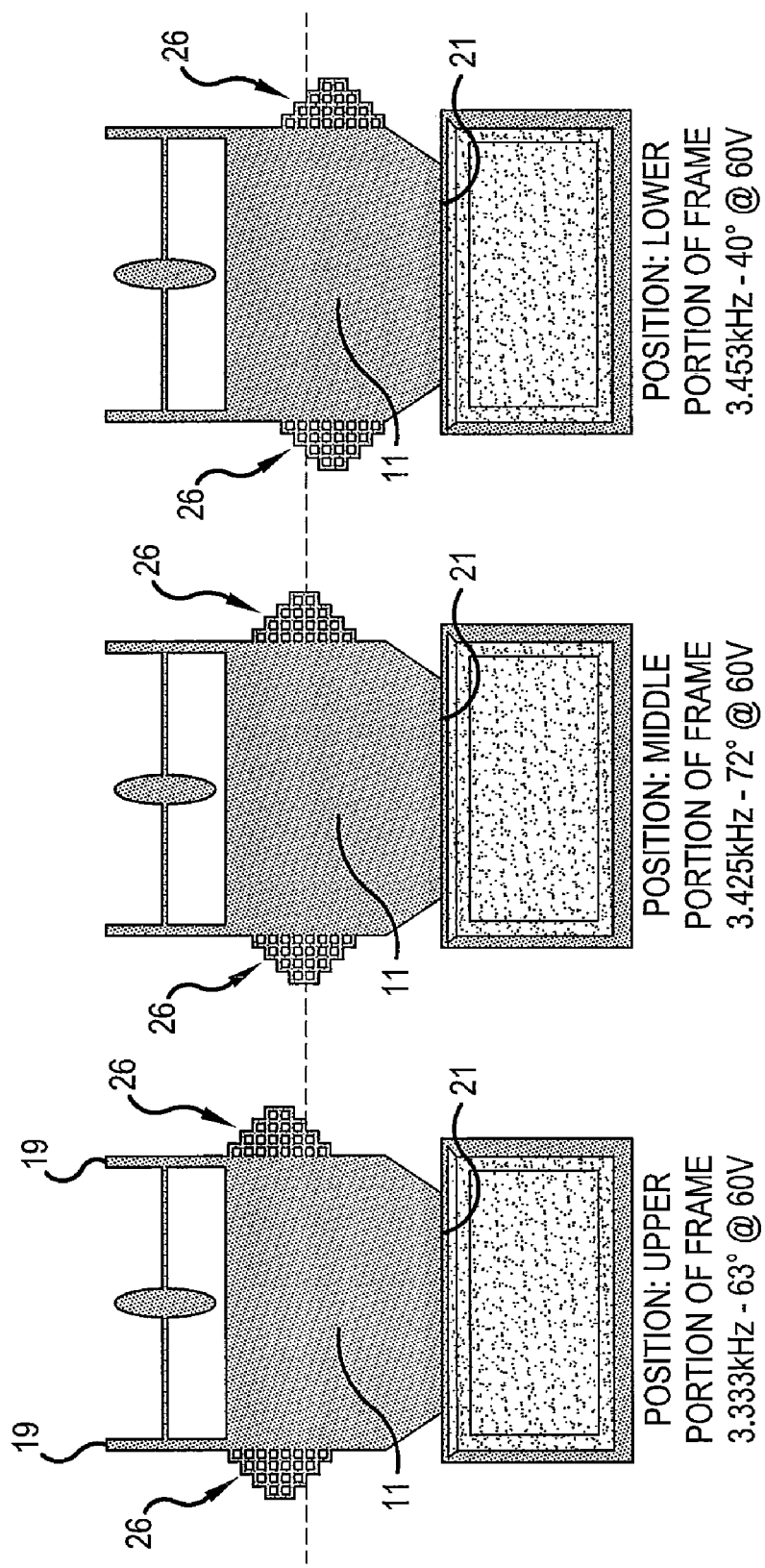

METHOD OF ADJUSTING A RESONANCE FREQUENCY OF AN OPTICAL SCANNING DEVICE

FIELD OF THE INVENTION

The present invention relates to a method of adjusting a resonance frequency of an optical scanning device which performs scans by scanning of a optical beam, and, in particular, of the optical scanning device in which a mirror supported by torsion beams (torsion bars) is oscillated or swung, to polarize the optical beam.

BACKGROUND OF THE INVENTION

In recent years, optical scanners which scan optical beams of laser light or the like have been used as optical instruments, such as bar code readers, laser printers, head mounted displays, and the like, or as optical intake devices of input devices, such as infrared cameras, and the like. Optical scanners having a structure in which a mirror obtained via silicon micromachining technology is oscillated have been proposed for this type of optical scanner.

For example, JP-A-11-52278 ("JP-A" means unexamined published Japanese patent application) (referred to below as 'Patent document 1') discloses an optical scanner having a silicon mirror, as shown in FIG. 17. This optical scanner is manufactured using silicon micromachining technology and is formed having an overall size of several millimeters square. A supporting substrate 71 is formed as a rectangular plate having a recessed portion 71a formed in a center portion thereof. A mirror 72 which is formed from a silicon thin film is internally supported inside this recessed portion 71a. Two torsion bars 73a and 73b which are formed integrally with the mirror 72 protrude from two ends thereof. Distal end portions of these torsion bars 73a and 73b are fixed to the supporting substrate 71, and are connected respectively to pads 74a and 74b. As a result, the mirror 72 is able to be swung or oscillated between the planar direction of the mirror and a direction which is perpendicular to the mirror surface, by the twisting of the torsion bars 73a and 73b. Impurity ions are implanted at least at peripheral areas or at the surface of the mirror 72 so as to become diffused over these areas, or alternatively, these areas may be covered by aluminum or silver or by a conductive organic thin film, resulting in these areas forming an electrode portion 75 which is electrically conductive.

In contrast, fixed electrodes 77a and 77b are located respectively at positions on both sides of the recessed portion 71a on the surface of the supporting substrate 71 via an insulator 76. These fixed electrodes 77a and 77b are formed by semiconductors or conductive materials composed of organic materials, and inner side edge portions of each of these fixed electrodes 77a and 77b are placed adjacent to the electrode portion 75 which is located at the edges on each side of the mirror 72. Thus, a condenser is formed between the electrode portion 75 and the respective fixed electrodes 77a and 77b.

If a voltage is applied between a pad 78a of the one fixed electrode 77a and the pads 74 a and 74b of the torsion bars 73a and 73b, then this voltage is applied to the mirror electrode portion 75 which is connected to the pads 74a and 74b, and electric charges having mutually opposite polarities are accumulated on the surface of the fixed electrode 77a and the mirror electrode portion 75 so as to form a condenser. Electrostatic attraction then begins to work between the fixed electrode 77a and the mirror electrode portion 75, and the mirror 72 starts to rotate. Then, after the mirror 72 has returned to its original position, by then applying voltage between the fixed electrode 77b on the opposite side and the mirror electrode portion 75, the mirror 72 is again rotated, this time in the opposite rotation direction. By performing this type of operation repeatedly, the mirror 72 makes a swinging motion (oscillation motion) by repeating a motion of rotating between the positions of maximum rotation in the anticlockwise direction and the clockwise direction.

Further, JP-A-10-197819 (referred to below as 'Patent document 2') describes an optical scanner in which a mirror obtained by means of silicon micromachining technology is oscillated.

As shown in FIG. 18, this optical scanner is provided with: a plate-shaped mirror 81, which is used to reflect light; a pair of rotation supporting bodies 82, which are positioned on a straight line and support the mirror 81 from each side thereof, in which the mirror 81 are connected to the pair of rotation supporting bodies 82; a frame portion 83, which surrounds the periphery of the mirror 81; and a piezoelectric element 84, which applies translational motion to the frame portion 83. In addition, this optical scanner is structured such that the center of gravity of the mirror 81 is located at a position outside the straight line connecting together the pair of rotation supporting bodies 82.

When voltage is applied to the piezoelectric element 84, the piezoelectric element 84 is made to expand and contract, so as to vibrate in the Z axial direction. This vibration is transmitted to the frame portion 83. When the mirror 81 is made to undergo relative motion relative to the driven frame portion 83 and the vibration component in the Z axial direction is transmitted to the mirror 81, because the mirror 81 has a left-right asymmetrical mass component relative to the axis formed by the X axis rotation supporting bodies 82, rotational moment is generated in the mirror 81 centered on the X axis rotation supporting bodies 82. In this manner, the translational motion which has been applied to the frame portion 83 by the piezoelectric element 84 is transformed into rotational motion centering on the X axis rotation supporting bodies 82 of the mirror 81.

Further, JP-A-10-104543 (referred to below as 'Patent document 3') describes an optical scanning device, as shown in FIG. 19. In this optical scanning device, beam portions 93 and 93 extend in mutually opposite directions from both sides of a movable portion (mirror) 92 in a vibrator 91, and are connected to two arm portions 94 and 94 of a fixed portion 96. Piezoelectric thin films 95 and 95 are provided respectively on the arm portions 94 and 94 of the fixed portion 96, and these piezoelectric thin films 95 and 95 are driven by the same signal which includes higher order vibration frequencies.

However, the optical scanner described in Patent document 1 is manufactured to be several millimeters square using silicon micromachining technology, and the electrode portion 75 is formed on at least peripheral areas or on the surface of the mirror 72. In addition, the pads 74a and 74b are provided on the torsion bars 73a and 73b, and it is necessary to place the respective fixed electrodes 77a and 77b and pads 74a and 74b at positions on both sides of the surface of the supporting substrate 71 via the insulator 76.

In this manner, because the electrode portion 75 is formed on at least peripheral areas or on the surface of the mirror 72, and the pads 74a and 74b are formed on the torsion bars 73a and 73b, and the respective fixed electrodes 77a and 77b and pads 78a and 78b are formed at positions on both sides of the surface of the supporting substrate 71 via the insulator 76, the manufacturing of this optical scanning device is complex, and not only have the causes for possible failures increased, but the time period required for manufacturing has also increased. Accordingly, there is a problem in that cost increases.

Further, in the optical scanner described in Patent document 2, since a structure is employed in which translational motion applied to the frame portion 83 by the piezoelectric element 84 is transformed into rotational motion centering on the X axis rotation supporting bodies 82 of the mirror 81, it is necessary to shift the center of gravity position of the mirror 81 relative to the torsion bars (82).

Moreover, the device also needs to have a certain thickness not only in the X-Y axial directions, but also in the Z axial direction, so that it is difficult for this device to be manufactured with a narrow thickness.

Further, the optical scanning device described in Patent document 3 has the drawback that a large torsion angle cannot be formed in the movable portion 92.

Namely, if a piezoelectric thin film 95 is formed in the two narrow beam portions 94 which are provided on the fixed portion 96, then the rigidity of this portion increases and vibration which is induced in the piezoelectric thin film 95 is not transmitted efficiently to the torsion bars 93 on the beam portions 94. As a result, the torsional vibration of the mirror 92 is reduced. Moreover, unless the vibration characteristics of the vibration source portion formed by the two beam portions 94 and the piezoelectric thin film 95 which is formed thereon are matched precisely, then the vibration amplitude of the torsional vibration of the mirror 92 becomes suppressed and, at the same time as that, torsion modes other than torsional vibration are superimposed thereon so that accurate laser beam scanning cannot be achieved. Furthermore, in order to increase the drive force for the mirror 92 by increasing the surface area of the piezoelectric thin film portion 95, it is necessary to increase the width of the beam portions 94. Because of this, an unnecessary two-dimensional vibration mode is generated in the same beam portion 94, so that at the same time as the vibration amplitude of the torsional vibration of the mirror 92 is restricted, a vibration mode other than the torsional vibration is superimposed thereon. As a result, there is caused a problem in that it is not possible to achieve accurate laser beam scanning. Moreover, because the width of the beams 94 is restricted to a narrow width, the formation of the top portion electrodes which are used to drive the piezoelectric thin film 95 formed on this portion is made more difficult because of the narrow width, so that problems arise such as the yield upon production being conspicuously affected.

FIG. 20 shows the same case as that of Patent document 3 (FIG. 3, as explained later), and shows a structure in which a piezoelectric film is formed on two narrow-width cantilever beam portions which support two torsion bars which protrude from a frame portion. The drive efficiency of the mirror portion scan angle was examined by a simulation calculation. The surface where Y=0 was taken as a plane of symmetry, and half of this was used as a model.

FIG. 21 shows the torsion angle of a mirror having a structure in which a piezoelectric film is formed on two narrow-width cantilever beam portions which support two torsion bars which protrude from the frame portion shown in FIG. 20. The drive voltage was set at 1 V, while the characteristics of a PZT-5A which are typical parameters were used for the electrical characteristics of the piezoelectric body constituted the piezoelectric film, while the characteristics of SUS 304 were used for the material of the scanner frame main body. The torsion angle of the mirror portion was small at only 0.63°.

As mentioned in the above Patent documents 1 to 3 each associated with the problems. Thus, in order to solve the problems in the techniques as described in Patent documents 1 to 3, the inventors have previously proposed an optical scanning device as described in International Patent Publication No. WO2008/044470 (referred to below as 'Patent document 4'). This optical scanning device is one in which, using a simple structure, it is possible to efficiently generate torsional vibration in a mirror portion, by forming a piezoelectric actuator on a substrate having torsion bars which support a mirror portion using thin-film formation technology, such as an aerosol deposition method (which may be referred to below on occasion as 'AD method'), a sputtering method, or a sol-gel method, and by then generating torsional vibration in the mirror portion using the vibration of the substrate.

The aerosol deposition method (AD method) is a method of forming a film or micro structure by bonding brittle ultra-fine-particles, which method comprises: browning the brittle ultra-fine-particles to place the particles on a substrate; applying a mechanical impact force or ultrasonic to the brittle ultra-fine-particles, to break the brittle ultra-fine-particles; having the brittle ultra-fine-particles bond together at broken faces caused by the breakage, thereby to form said film or micro structure high in density and mechanical strength composed of a brittle ultra-fine-particle material. As examples of the aerosol deposition method (AD method), use may be made, for example, of methods and apparatuses, as described in U.S. Pat. No. 6,531,187 B2 (U.S. 2002/0071905 A1), U.S. Pat. No. 6,827,634 B2 (U.S. 2001/0044259 A1), U.S. Pat. No. 7,153,567 B1, U.S. 2006/0201419 A1, and U.S. 2008/0241556 A1. Further, in the aerosol deposition method (AD method), in addition of a first step of the above-described applying a mechanical impact force or ultrasonic to the brittle ultra-fine-particles, a second step may be conducted to heat-treat the ultra-fine-particles at a low temperature lower than a sintering temperature of the same. As examples of such an aerosol deposition method (AD method) which includes the heat-treatment second step, use may be made, for example, of methods, as described in U.S. Pat. No. 7,276,193 B2 (U.S. 2005/0181208 A1) and U.S. Pat. No. 7,658,996 B2 (U.S. 2008/0220962 A1). The above-identified aerosol deposition methods (AD methods) and apparatuses for the AD methods as described in the above-mentioned U.S. Pat. No. 6,531,187 B2 (U.S. 2002/0071905 A1), U.S. Pat. No. 6,827,634 B2 (U.S. 2001/0044259 A1), U.S. Pat. No. 7,153,567 B1, U.S. 2006/0201419 A1, U.S. 2008/0241556 A1, U.S. Pat. No. 7,276,193 B2 (U.S. 2005/0181208 A1), and U.S. Pat. No. 7,658,996 B2 (U.S. 2008/0220962 A1), each are herein entirely incorporated by reference.

Reductions in size and cost may be achieved in a simple structure by the optical scanning device described in Patent document 4. However, it is difficult to finely adjust the torsional vibration in the mirror portion by the optical scanning device described in Patent document 4, and hence it is desired to make it possible to finely adjust the torsional vibration by a simple means.

In order to solve the above-mentioned problems, the present invention is contemplated for providing a method which can finely adjust a resonance frequency in an optical scanning device, in a readily manner and in a simple structure.

SUMMARY OF THE INVENTION

One of the features of the present invention is to trim not the mirror portion and the torsion bar portions (i.e. mirror support beam portions) but the substrate including a substrate main body and cantilever beam portions, thereby to finely adjust a resonance frequency which determines a resonance vibration of the mirror portion. The fine adjustment via trimming may be performed: by reducing an area of the substrate (i.e. the area contributing the vibration of the mirror portion) which protrudes from a fixed end, at which the substrate main body is attached to the supporting component, to an outside of the supporting component, thereby to increase the resonance frequency; or by increasing an area of the substrate (i.e. the area contributing the vibration of the mirror portion) which protrudes from a fixed end, at which the substrate main body is attached to the supporting component, to an outside of the supporting component, thereby to decrease the resonance frequency.

According to the present invention, there are provided the following means:

(1) A method of adjusting a resonance frequency in an optical scanning device, comprising the steps of:
providing the optical scanning device comprising:
a substrate comprising:
a substrate main body; and
two cantilever beam portions protruding from one side of the respective side portion of the substrate main body;
a drive source positioned in a portion of the substrate main body, for vibrating the substrate;
a mirror portion which is positioned between the two cantilever beam portions, supported at both sides by mirror support beam portions, and vibrated by resonance vibration at a resonance frequency by the vibration of the substrate;
a light source for emitting light to the mirror portion, to change a direction of reflection light by the resonance vibration; and
a supporting component for fixing the substrate main body at a fixed end on an opposite side of the two cantilever beam portions; and
reducing an area of the substrate which protrudes from the fixed end, at which the substrate main body is attached to the supporting component, to an outside of the supporting component, thereby to increase the resonance frequency; or alternatively, increasing the area of the substrate which protrudes from the fixed end, at which the substrate main body is attached to the supporting component, to the outside of the supporting component, thereby to reduce the resonance frequency;

(2) The method of adjusting a resonance frequency in an optical scanning device according to Item (1), further comprising:
partially cutting an external side portion of the substrate main body and external side portions of the two cantilever beam portions, to narrow a lateral width of the substrate, so that an area of the substrate which protrudes from the fixed end, at which the substrate main body is attached to the supporting component, to the outside of the supporting component is reduced, thereby to increase the resonance frequency;

(3) The method of adjusting a resonance frequency in an optical scanning device according to Item (2), wherein each of the external side portions of the substrate main body and the external side portions of the two cantilever beam portions are provided with a plurality of holes in at least a part thereof, and wherein the partially cutting is performed along a line passing through at least one of the plurality of holes;

(4) The method of adjusting a resonance frequency in an optical scanning device according to any one of Items (1) to (3), wherein the substrate has been attached to the supporting component to adjustably set a protruding length of the substrate main body protruding from the fixed end to the outside of the supporting component, and
wherein the protruding length is lengthened, and the area of the substrate which protrudes from the fixed end, at which the substrate main body is attached to the supporting component, to the outside of the supporting component is increased, thereby to reduce the resonance frequency; or alternatively, the protruding length is shortened, and the area of the substrate which protrudes from the fixed end, at which the substrate main body is attached to the supporting component, to the outside of the supporting component is reduced, thereby to increase the resonance frequency;

(5) A method of adjusting a resonance frequency in an optical scanning device, comprising the steps of:
providing the optical scanning device comprising:
a substrate comprising:
a substrate main body; and
two cantilever beam portions protruding from one side of the respective side portion of the substrate main body;
a drive source positioned in a portion of the substrate main body, for vibrating the substrate;
a mirror portion which is positioned between the two cantilever beam portions, supported at both sides by mirror support beam portions, and vibrated by resonance vibration at a resonance frequency by the vibration of the substrate;
a light source for emitting light to the mirror portion, to change a direction of reflection light by the resonance vibration; and
a supporting component for fixing the substrate main body at a fixed end on an opposite side of the two cantilever beam portions;
providing additional frames to the substrate in an external side portion of the substrate; and
partially cutting external side portions of the additional frames, to reduce a sum total of an area of the substrate which protrudes from the fixed end, at which the substrate main body is attached to the supporting component, to an outside of the supporting component, and an area of the additional frames, thereby to increase the resonance frequency; or alternatively,
increasing the area of the substrate which protrudes from the fixed end, at which the substrate main body is attached to the supporting component, to the outside of the supporting component, thereby to reduce the resonance frequency;

(6) The method of adjusting a resonance frequency in an optical scanning device according to Item (5), wherein the additional frames are provided with a plurality of holes, and wherein the partially cutting is performed along a line passing through at least one of the plurality of holes;

(7) The method of adjusting a resonance frequency in an optical scanning device according to Item (5) or (6), wherein the additional frames have at least one slit which is sealable with a sealing material; and wherein the at least one slit is sealed with the sealing material, to increase the sum total of the area of the substrate which protrudes from the fixed end, at which the substrate main body is attached to the supporting component, to the outside of the supporting component, and the area of the additional frames, thereby to reduce the resonance frequency; and (8) The method of adjusting a resonance frequency in an optical scanning device according to any one of Items (5) to (7), wherein the additional frames are positioned on the substrate main body, so that a length of a vertical line from a face center of the additional frames to a line extending the fixed end would be equal to a length of a vertical line from a face center of the drive source to a line extending the fixed end.

Herein, the term "trimming" means to decrease or increase an area of the substrate, which protrudes from the fixed end to an outside of the supporting component, thereby to increase or decrease the resonance frequency, respectively; or to decrease or increase a sum total area of the substrate and the additional frames, each of which protrude from the fixed end to an outside of the supporting component, thereby to increase or decrease the resonance frequency, respectively. The trimming can be preformed by cutting the substrate or the additional frame; by lengthening the protruding length of the substrate from the fixed end of the supporting component; or by sealing the slits in the additional frame by a sealing material, each of which results to either decrease or increase the area of the substrate or the sum total area of the substrate and the additional frame, which protrude from the fixed end to an outside of the supporting component.

The present invention can exhibits the excellent advantageous effects described below.

According to the method of finely adjusting the resonance frequency according to the present invention, the resonance frequency can be finely adjusted by trimming not the mirror portion and the torsion bar portions but the substrate portion, and hence the trimming operation may be simply and readily performed.

Further, the plurality of holes provided in the substrate may be used for cutting, and hence the cutting is facilitated. In addition, the plurality of holes exhibit an effect of reducing noises caused when the substrate is vibrated.

When the additional frames are used exclusively for the fine adjustment, a trimming operation may be simply performed. When mounting positions of the additional frames are set so that the distance between the face center of the additional frames and the fixed end is equal to the distance between the face center of the drive source and the fixed end, a reduction in torsion angle which is caused by providing the additional frames may be minimized.

The additional frames may have slits which are sealable or fillable with a sealing material (which is made of any material such as silicon, plastics, or the like). Then, when the slits are filled with the filler, the fine adjustment may be performed to reduce the resonance frequency.

Other and further features and advantages of the invention will appear more fully from the following description, appropriately referring to the accompanying drawings.

BRIEF DESCRIPTION OF THE DRAWINGS

FIGS. 7(a) to 7(e) are views showing various substrate shapes.

FIGS. 8(a) to 8(c) are views showing three examples of substrate support modes.

FIGS. 12(a) to 12(c) are explanatory views illustrating a method of adjusting a lateral width of the substrate, according to an embodiment of the present invention.

FIGS. 13(a) and 13(b) are explanatory views illustrating a method of adjusting a position of a substrate fixed to a support member, according to another embodiment of the present invention.

FIGS. 14(a) to 14(c) are explanatory views illustrating adjustment methods of cutting additional frames provided in a substrate main body, according to still another embodiment of the present invention.

FIGS. 16(a) to 16(c) are explanatory views illustrating changes in characteristics depending on mounting positions of the additional frames in the embodiment illustrated in FIG. 14.

DETAILED DESCRIPTION OF THE INVENTION

The present invention will be described in detail below, first, with respect to the principle and the fundamental elements of the optical scanning device for generating torsional vibration in a mirror portion, with reference made to the drawings.

The optical scanning device according to the present invention is the same as that described in Patent document 4, except for the manner of trimming the substrate portion thereby to adjust the resonance frequency of the optical scanner. The above-identified optical scanner as described in the above-mentioned International Patent Publication No. WO2008/044470 (Patent document 4) is herein entirely incorporated by reference.

(Principle of Generating Torsional Vibration In Mirror Portion)

Figure 1:
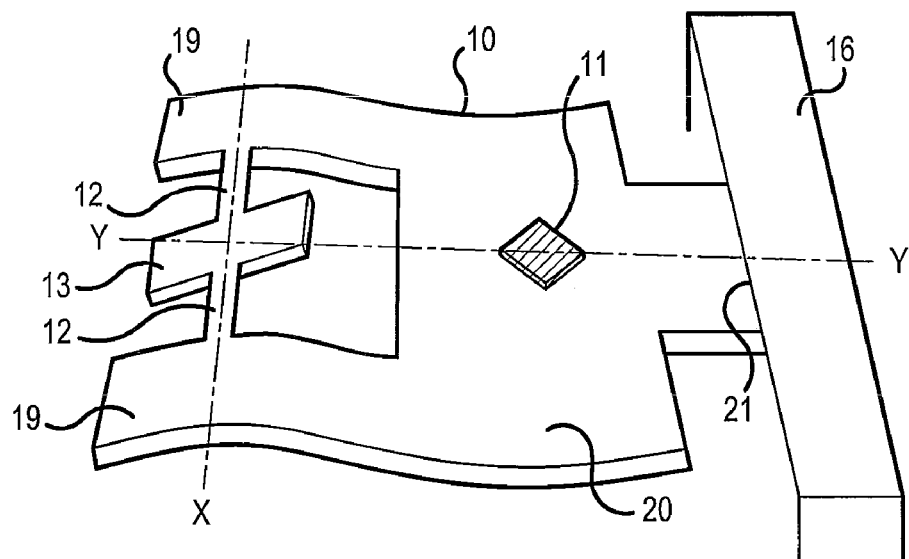
FIG. 1 is a conceptual view illustrating basic elements of the optical scanner according to the present invention.

As shown in FIG. 1, the basic structure of the optical scanning device according to the present invention includes: a substrate 10, which is formed by a substrate main body 20 and by two cantilever beam portions 19 and 19 protruded from the respective side portion at one end of the substrate main body; torsional bar portions for supporting a mirror (herein also referred to torsion bar portions 12 and 12), which are provided between the cantilever beam portions 19 and 19, so as to support a mirror portion 13 from both sides thereof; a drive source 11, which is formed by a piezoelectric film or the like provided on the substrate main body 20; and a supporting component 16, which fixes a fixed end 21 of the substrate main body, at the opposite side to the mirror portion 13 side of the substrate main body. The torsion bar portions 12 which support the mirror portion 13 extend in a perpendicular direction (i.e. in the X axial direction) relative to the axial direction of the cantilever beam portions 19.

The light source is not shown in the drawings in this application, but the light source in the optical scanning device according to the present invention may be, for example, one which is shown in FIG. 12 in WO2008/044470 (Patent document 4). In FIG. 12 in WO2008/044470, the light source is not explicitly given a specific symbol or reference numeral, but the laser beam (17, in said FIG. 12 in WO2008/044470) is irradiated to the mirror portion (13, in said FIG. 12 in WO2008/044470) from a lens that is a part of the light source in the figure. In the present invention, the light source can be provided in the same manner as in FIG. 12 in WO2008/044470, but the invention is not limited to that and the light source can be provided in a usual manner in any of usual optical scanning devices or MEMS optical scanners.

Figure 2A:
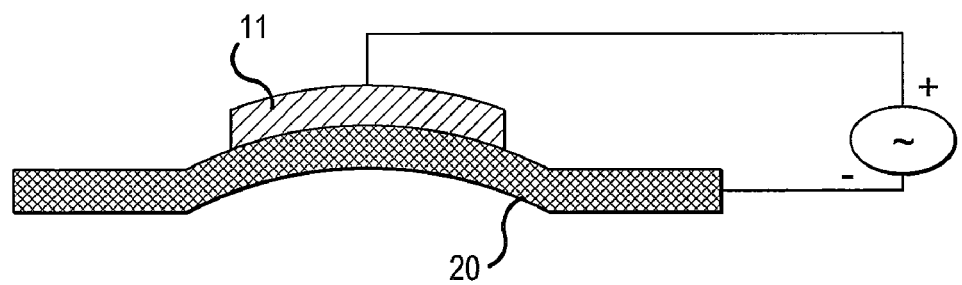
FIGS. 2(a) and 2(b) are conceptual views illustrating the vibration generation principle in the optical scanner according to the present invention.
Figure 2B:
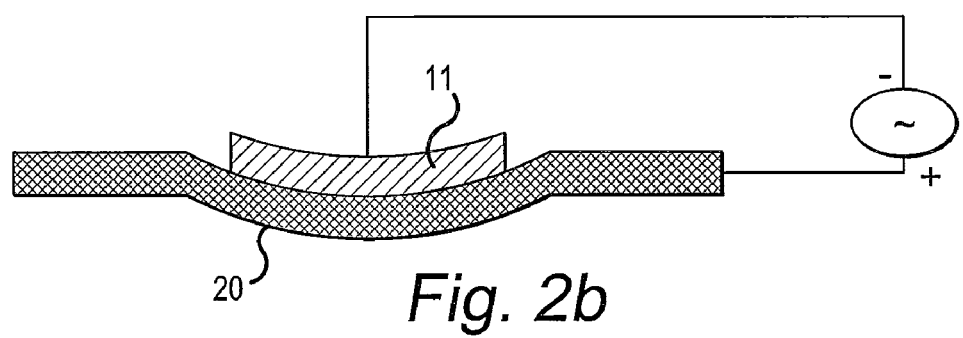

As shown in FIG. 2, when voltage is applied to the drive source 11 which is in the form of a piezoelectric film, deflection is generated in the substrate main body 20 directly beneath the piezoelectric film in conjunction with the deflection of the piezoelectric film, and vibration is generated in the substrate main body 20. Namely, as shown in FIG. 2(a), if a positive voltage is applied to the piezoelectric film side, the piezoelectric film stretches, while conversely, as shown in FIG. 2(b), if a negative voltage is applied to the piezoelectric film side, the piezoelectric film contracts, thereby each generating vibration in the substrate 10.

At this time, the vibration generated in the substrate main body 20 is transmitted from the substrate main body 20 to the cantilever beam portions 19, so that a force is generated which imparts a rotational moment to the mirror portion 13 which is in a horizontal state and is supported by the torsion bar portions 12 shown in FIG. 1, thereby inducing torsional vibration therein.

(Placement of Drive Source)

As described in the above in relation to Patent document 3, when the drive source 11 is provided on the torsion bar portions 12 and the cantilever beam portions 19 each of which are close to the mirror portion 13, it is not possible to cause the mirror portion 13 to vibrate at a large torsion angle.

In contrast to this, in the present invention, by forming a single piezoelectric film that functions as the drive source 11 on the substrate main body 20, the rigidity of the two cantilever beam portions 19 and 19 is lowered and torsional vibration is efficiently induced in the mirror portion 13. At the same time as this, by providing only a single drive source 11 to drive the mirror portion 13, it is possible to solve the above-described problems of the generation of unnecessary vibration modes and of a reduction in vibration amplitude, each of which is caused by irregularities or the like in the drive source 11. Moreover, by using the above-described two cantilever beam portions 19 and 19 to separate the portion where the piezoelectric film, i.e. the drive source 11, is formed from the mirror torsional vibration portion which is formed by the mirror portion 13 and by the torsion bar portions 12 which support the mirror portion 13, the surface area of the piezoelectric film of the drive source 11 can be designed freely irrespective of the width of the cantilever beam portions 19, and it is possible to efficiently impart a large driving force by means of the mirror torsional vibration portion. Furthermore, formation of the electrodes used to drive the piezoelectric film becomes also readily, so that it is possible to increase the yield upon industrial production.

Figure 3:
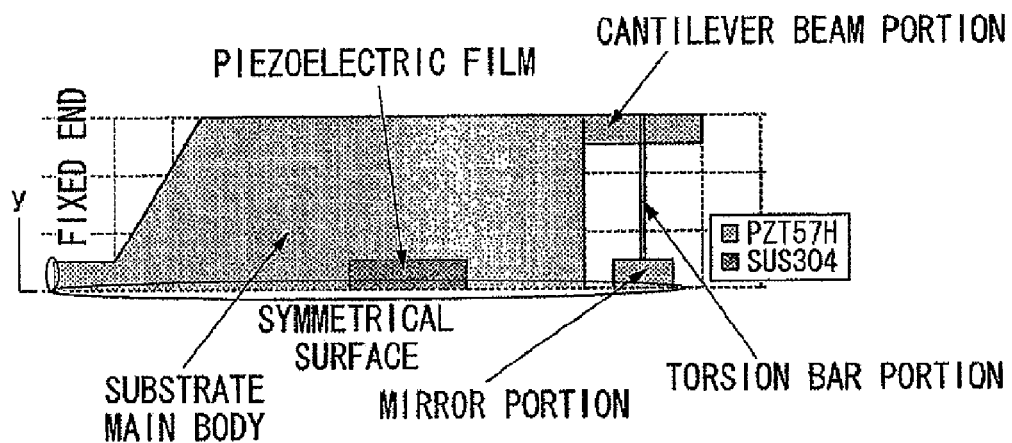
FIG. 3 is a plan view of an optical scanning device according to the present invention which has a structure in which a single piezoelectric film is formed on a substrate main body, with a surface where Y=0 being taken as a plane of symmetry, and with half of this being used as a model.

FIG. 3 is a plan view showing the optical scanning device according to the present invention which is structured such that one piezoelectric film forming the drive source 11 is formed on the substrate main body 20, wherein the surface where Y=0 is taken as a plane of symmetry, and only half of this is used as a model. The dimensions of the mirror portion 13 and the dimensions of the torsion bar portions 12, the mounting position where the torsion bar portions 12 are mounted on the mirror portion 13 (i.e. the position of the center of gravity of the mirror portion 13), the shape of the substrate 10 as well as the method which is used to support it, and also the thickness and the total value of the surface area of the piezoelectric film, which all provide the basic structure of the optical scanning device, are made the same as in the optical scanning device as described in Patent document 3. This optical scanning device only differs in the position where the piezoelectric film 11 to be the drive source is formed.

Figure 4:
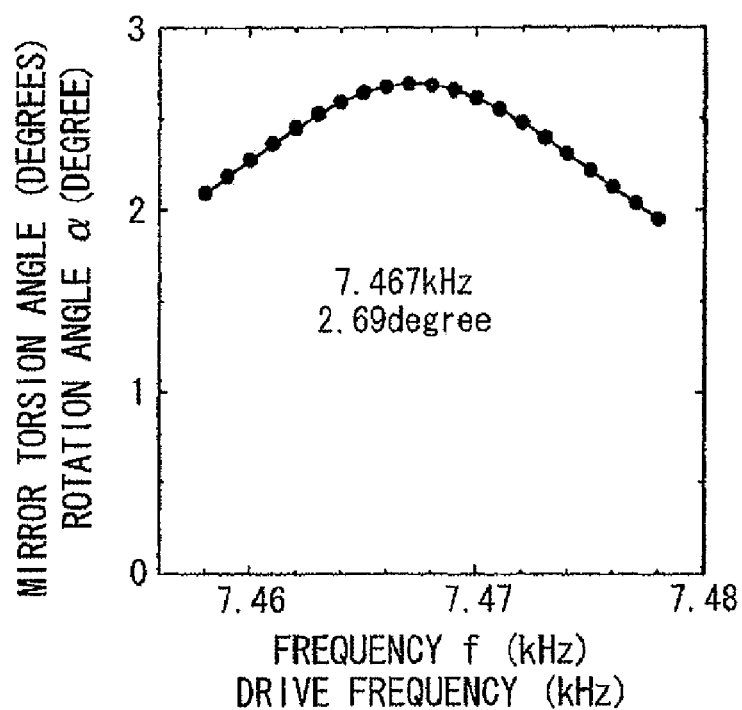
FIG. 4 is a graph showing a torsion angle of a mirror portion of the device shown in FIG. 3.
Figure 19:
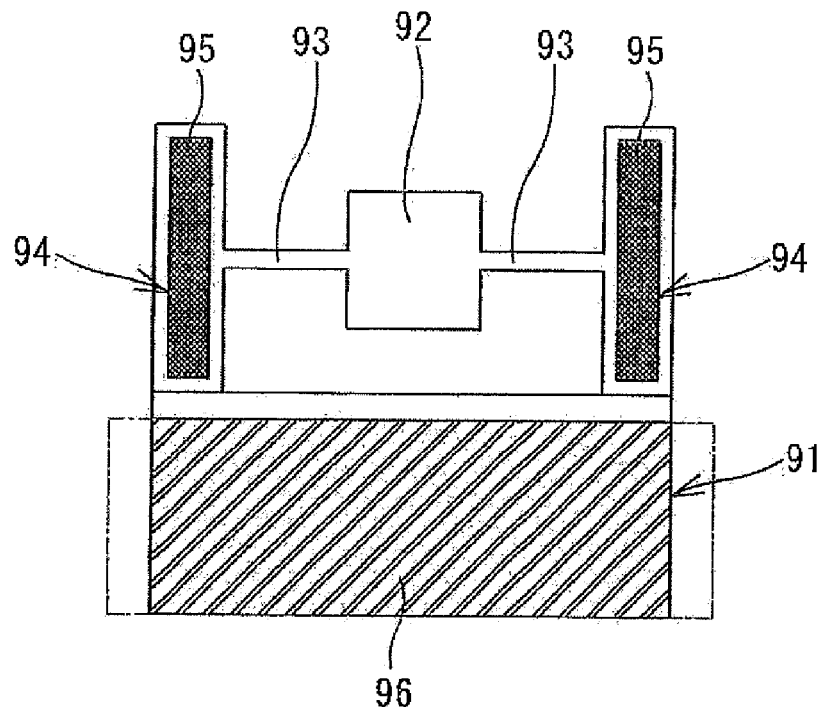
FIG. 19 is a plan view showing the optical scanner as described in Patent document 3.
Figure 20:
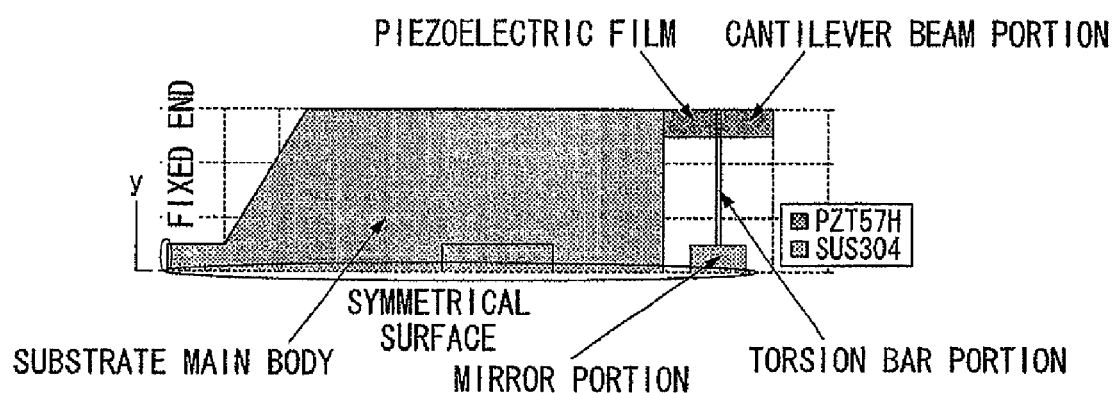
FIG. 20 shows the same type of structure as in the case of the optical scanner as described in Patent document 3, with a surface where Y=0 being taken as a plane of symmetry, and with half of this being used as a model.
Figure 21:
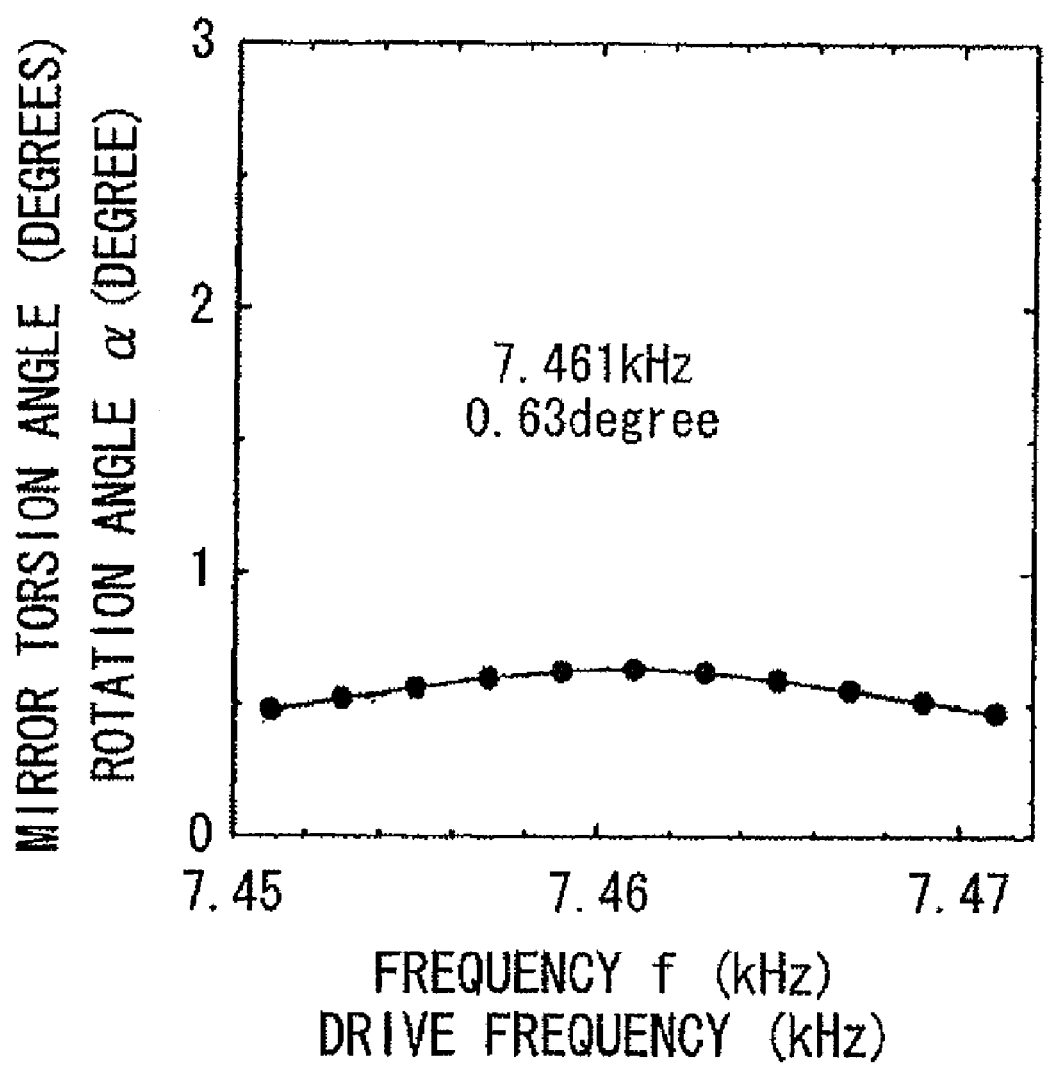
FIG. 21 is a graph showing a torsion angle of a mirror portion of the device having the structure shown in FIG. 20.

FIG. 4 shows the torsion angle of the mirror portion 13 of the device shown in FIG. 3. The drive voltage was set at 1 V, while the characteristics of a PZT-5A which are typical parameters were used for the electrical characteristics of the piezoelectric body to constitute the piezoelectric film, while SUS 304 characteristics were used for the material of the scanner frame main body. Basically, the resonance frequency in the optical scanner according to the present invention, as shown in FIG. 3, is substantially the same as that in the optical scanner described in Patent document 3, as shown in FIG. 19. However, while, in the optical scanner as described in Patent document 3, the torsion angle of the mirror portion 13 was only 0.63°, in the optical scanner according to the present invention shown in FIG. 3, it was confirmed to have an approximately 4.3 times greater than the above torsion, namely, the torsion angle was 2.69° (80.7° at a conversion of 30V).

It is also possible to position a plurality of vibration sources on a substrate in order to increase the mirror scan amplitude, however, in this case, because of irregularities in the mounting state due to the characteristics of the vibration sources or the mounting positions, or to the adhesion or film formation, it becomes apt to occur two-dimensional vibration which is asymmetrical relative to the axis of symmetry in a perpendicular direction relative to the torsion bars supporting the mirror portion to be induced in the substrate, which results in a deterioration in the scanning accuracy of the optical beam due to the torsional vibration of the mirror portion. In contrast to this, according to the present invention, torsional vibration is induced efficiently in the mirror portion even though there is only one vibration source, and it is possible to largely reduce scan jitter in the optical beam, and suppress product irregularities.

In order to obtain the maximum amplitude in the torsion angle of the mirror portion 13 at a fixed drive voltage, the placement of the drive source 11 on the mirror portion 13 has importance. If the drive source 11 is placed at a position away from the connecting positions where the torsion bar portions 12 which support the mirror portion 13 connect to the cantilever beam portions 19, namely, in a portion of the substrate main body 20, for example, in a center portion of the substrate main body 20, then it is possible to cause the mirror portion 13 to vibrate with a large torsion angle.

Further, if vibration is generated when the drive source 11 is placed at a position away from the connecting positions where the torsion bar portions 12 which support the mirror portion 13 connect to the cantilever beam portions 19, then the drive source 11 is positioned such that the minimum amplitude of the substrate vibration (i.e. the bottom point of the vibration) is obtained in the vicinity of the connecting positions where the torsion bar portions 12 which support the mirror portion 13 connect to the cantilever beam portions 19.

Moreover, if the connecting portions between the cantilever beam portions 19 and the substrate main body 20 are positioned in the vicinity of the maximum amplitude of the substrate vibration which is excited in the substrate main body 20 by the drive source 11, then it is possible to cause the mirror portion 13 to vibrate at a larger torsion angle.

One method of matching together the vibration modes of the torsion bar portions 12 and 12 which support the mirror portion 13 from both sides thereof is, for example, to place the drive source 11 in the center in the transverse direction (i.e. on the Y axis in FIG. 1) of the substrate main body 20, and to make the distances from the drive source 11 to the torsion bar portions 12 and 12 on the left and right sides the same.

(Resonance Frequency)

As in the optical scanner according to the present invention, as shown in FIG. 1, in order to transmit vibration energy generated at a position separated from the mirror portion 13 as energy which efficiently generates torsional vibration in the mirror portion 13, it is necessary to considerably set the resonance frequency (fm) of the mirror portion 13 which is mainly determined by the mass of the mirror portion 13 and by the spring constant of the torsion bars 12, away from the resonance frequency (fb) which includes the division oscillation mode of the substrate 10 itself. When the drive source 11 of the optical scanning device is driven so as to match the resonance frequency (fm) of the torsional vibration of the mirror portion 13, then if a resonance mode is also induced in the substrate 10, the vibration energy generated by the vibration source becomes distributed between torsional vibration of the mirror portion 13 and two-dimensional division vibration of the substrate 10, due to the law of conservation of energy. Accordingly, the amplitude (i.e. the torsion angle) of the torsional vibration of the mirror portion 13 becomes smaller, by the amount of vibration energy from the drive source 11 which is consumed by the two-dimensional division vibration of the substrate 10, so that it becomes impossible to efficiently drive the optical scanning device.

Figure 5:
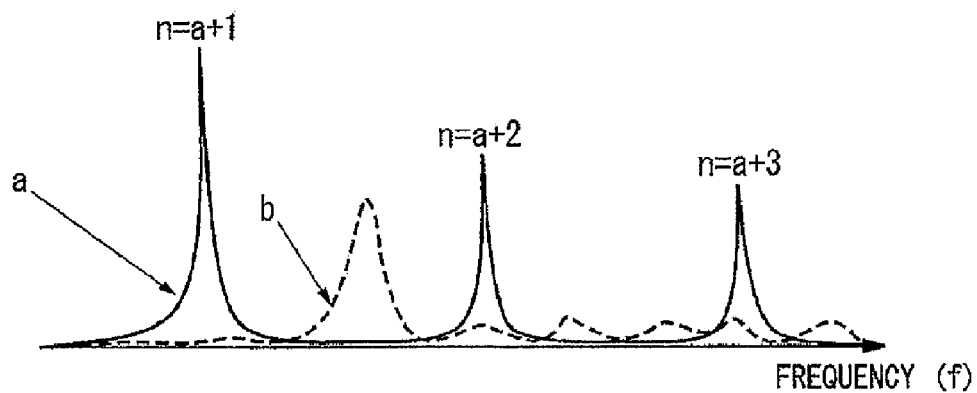
FIG. 5 is a view showing resonance frequencies of the substrate and mirror portion of the optical scanning device according to the present invention.

Moreover, if unnecessary two-dimensional division vibration is induced in the substrate 10, then there may be cases in which a vibration mode other than pure torsional vibration which has the torsion bars 12 as its axis of rotation becomes superimposed on the mirror portion 13 positioned at the distal end of the substrate 10, so that it becomes impossible to achieve an optical scan having a high level of accuracy in the rectilinear scan performance thereof. In contrast to this, as shown in FIG. 5, the present invention is designed such that the torsional resonance frequency a (fm(n), in which n=0, 1, 2, . . . ) which includes elements up to the higher orders induced in the mirror portion, does not overlap with the torsional resonance frequency b (fb(n), in which n=0, 1, 2, . . . ) which includes elements up to the higher orders induced in the frame portion.

(Thickness And Surface Area of Film Body of Piezoelectric Film And the Like Forming Drive Source)

The thickness and size of the film body of the piezoelectric film and the like forming the drive source 11 which causes the mirror portion 13 to vibrate, must be set at the optimum values, in accordance with the thickness and size of the substrate main body 20.

Taking the conditions which the optical scanning device will be used into consideration, based on a constant drive voltage (i.e. voltage applied to the piezoelectric film), the thinner the film body is, the greater the displacement which can be obtained is. In actuality, particularly in a film which is formed using the above-described aerosol deposition method (AD method), the characteristics of a piezoelectric film which is formed on a metal substrate show a dependency on the film thickness, namely, if the film is too thin, there is a deterioration in the piezoelectric characteristics and a deterioration in film characteristics such as an increase in leakage current and the like, while if the film is too thick, polarization processing becomes difficult. Moreover, when considering the flatness of the mirror when it is in operation and the mirror sizes required for applications such as projector devices, assuming that the substrate is formed from Si or stainless steel, then a thickness that is greater than or equal to at least 10 μm is required in the substrate 10. In consideration of these points, the optimum thickness of the film body of the piezoelectric film or the like which is suitable for driving the optical scanning device is appropriately less than or equal to 6 times the thickness of the substrate main body 20. A lower limit for the thickness of the film body is approximately 1 μm, and, at this time, it is possible to obtain the maximum mirror portion scan angle with the minimum drive voltage and power consumption for film thickness of the same surface area.

Moreover, if the surface area of the piezoelectric film or the like forming the drive source 11 is such that, in the above-described film thickness range, the length of the film body in the direction in which the vibration is transmitted over the substrate, is within a range that is smaller than approximately the ½ wavelength of the vibration which is decided by the resonance frequency driving the optical scanning device and the acoustic velocity of the substrate material, then driving can be efficiently performed. Furthermore, within this range, when considering power consumption, it is preferable for the surface area of the drive source 11 to be the same as or smaller than the substrate main body 20. More preferably, the surface area of the drive source 11 is less than or equal to ¾ the surface area of the substrate main body 20.

(Position of Center of Gravity of Mirror Portion)

Figure 6:
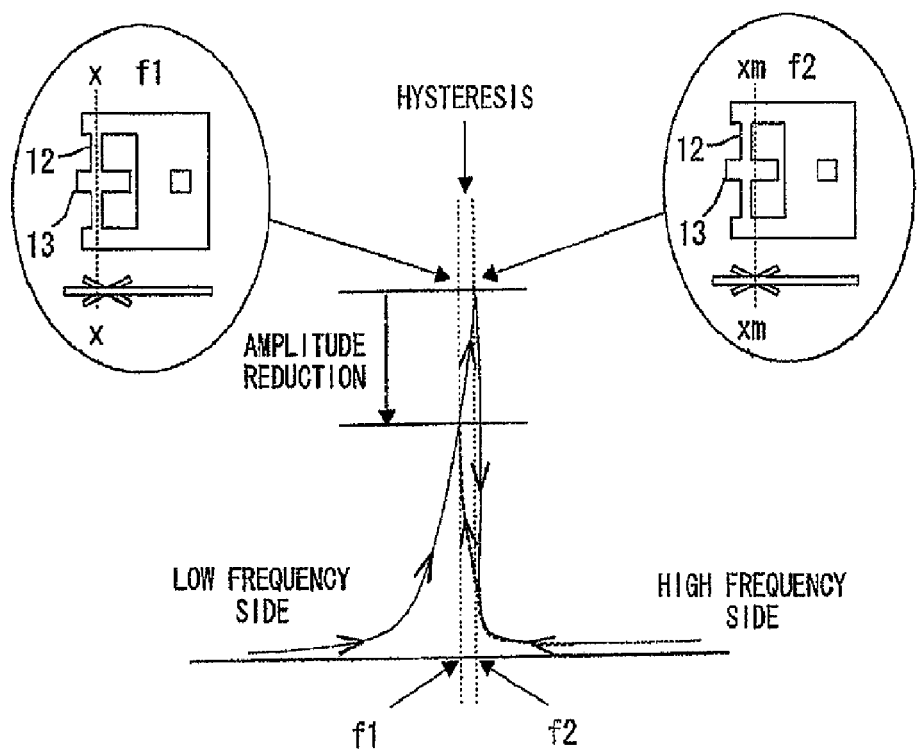
FIG. 6 is a view illustrating circumstances in which a large hysteresis is generated, in the case where the center of gravity of the mirror portion is shifted in the vertical direction relative to the axis of the torsion bar portions, either when the drive frequency approaches the resonance frequency from the low-frequency side, or when the drive frequency approaches the resonance frequency from the high frequency side.

When the mounting positions of the torsion bars 12 which support the mirror portion 13 of the optical scanning device are shifted from the position of the center of gravity of the mirror portion 13 in a perpendicular direction relative to the axis of the torsion bar portions 12, then, as shown in FIG. 6, two resonances f1 and f2 exist, namely, a torsional resonance mode centered on the axis of the torsion bar portions 12 (i.e. on the X axis), and a torsional resonance mode centered on the position of the center of gravity (Xm) of the mirror portion 13. At this time, there is a slight difference between the two resonance frequencies f1 and f2, and the amplitude of the angle of the torsional vibration (i.e. the optical scan angle) of the mirror in the vicinity of the resonance frequency is not the same, when the drive frequency approaches the resonance frequency from the low frequency side and when it approaches the resonance frequency from the high frequency side, and a large hysteresis is generated. In actual use, this hysteresis presents considerable problems. For example, a case in which the mechanical constant of the optical scanner is changed by fluctuations in the environmental temperature, which leads to a change in the resonance frequency which, in turn, leads to fluctuations in the optical scan angle might be considered, however, control to compensate for these fluctuations can generally be performed by changing the drive frequency applied to the drive source 11. However, if the aforementioned hysteresis is present, extremely complex control is required because of the non-linearity of the hysteresis, and such control is not practical. In contrast to this, if the position of the center of gravity of the mirror portion 13 is matched to the supporting position of the torsion bars 12, the aforementioned hysteresis does not appear, and favorable resonance characteristics can be obtained.

(Cross Section of Torsion Bar Portion)

Preferably, the cross section of the torsion bar portions 12 supporting the mirror portion 13 is ideally an axially symmetrical circle. However, in the actual manufacturing thereof, because it is formed from a plate or sheet material, it has a limited width and has a rectangular cross section. Because of this, if the width (W) of the torsion bar portions 12 is too large, then with even a slight processing error, a phenomenon occurs in which the position of the axis of the torsion bar portions 12 moves within the width (W) of the torsion bar portions 12 when resonating. Therefore, a hysteresis phenomenon occurs in the amplitude of the torsion angle (i.e. the optical scan angle) for drive frequencies in the vicinity of the resonance frequency, as described above, so that drive control is difficult. In order to solve this type of problem, it is necessary to keep the width (W) of the torsion bar portions 12 under a certain width. From experiments, it has been found that if the length of the torsion bar portions 12 is T1 and the substrate thickness is T2, then it is necessary for W to be within a range of $W/T1 \leq 0.4$ or $0.05 \leq T2/W \leq 2$, and it is preferable if $W/T1 \leq 0.2$ or $0.1 \leq T2/W \leq 0.5$.

(Method For Forming Piezoelectric Film)

If the above-described aerosol deposition method (AD method) is used to form the piezoelectric film then, because this is a low-temperature and high-speed process, it is possible to readily form a thick film of several micrometers or more directly on a metal substrate in a short period of time. However, the film formation method is not limited to this, and if a material having a heat-resistant temperature, for example, such as a silicon substrate, is used, then using the usual thin-film technology, such as a sputtering process, CVD process, or sol-gel process, or the like, it is possible to form an epitaxially grown high-performance piezoelectric thin-film. This is useful for forming even more precise optical scanning devices.

(Supporting Substrate)

In the substrate 10, if the fixed end 21 of the substrate main body 20 on the opposite side from the mirror portion 13 side is fixed to and supported in cantilever fashion by the supporting component 16, then the torsion amplitude of the mirror portion 13 can be increased.

In this case, the width of the fixed end 21 which is fixed by means of the supporting component 16, is preferably within a range of ¹⁄₂₀ to ¾ the width of the substrate main body 20, more preferably this width is within a range of ¹⁄₁₀ to ½ the width of the substrate main body 20.

If the width of the fixed end 21 of the substrate main body 20 on the opposite side from the mirror portion 13 side is made narrower than the width of the substrate main body 20, and this fixed end 21 is fixed to and supported in cantilever fashion by the supporting component 16, then it is possible to more efficiently generate vibration in the substrate main body 20 using the drive source 11, and it is possible to increase the torsion amplitude of the mirror portion 13.

The inventors confirmed that the narrower the width of the fixed end 21, the greater the torsion angle of the mirror portion 13 tends to be. In this case, the width of the fixed end 21 which is fixed by means of the supporting component 16 is suitably within a range of ¹⁄₂₀ to ¾ the width of the substrate main body 20. If the width is less than ¹⁄₂₀ the width of the substrate main body 20, then this is too narrow from practical aspects, and the fixing becomes unstable.

FIGS. 7(*a*) to 7(*e*) show various substrate shapes.

For example, FIG. 7(*a*) shows a case in which the fixed end 21 is the same as the width of the substrate main body 20. In this case, the torsion angle of the mirror portion 13 is 35°. When, however, the overall width of the fixed end 21 is narrower than the width of the substrate main body 20, as shown in FIGS. 7(*b*), 7(*c*), and 7(*d*), then it is possible to obtain a high mirror torsion angle that is greater than or equal to 40° in the mirror portion 13 from the same drive voltage.

Moreover, it was found that not only is the overall width of the fixed end 21 important, but also the shape thereof is important as well.

For example, if the width of the fixed end 21 was made smaller by cutting rectangular notches out of the left and right sides of the substrate main body 20 in the vicinity of the fixed end 21, as shown in FIG. 7(*b*) (referred to as an H shape), the torsion angle was 46°. If the width of the fixed end 21 was made smaller by cutting trapezoidal notches out of the left and right sides of the substrate main body 20 in the vicinity of the fixed end 21, as shown in FIG. 7(*c*) (referred to as an Y shape), the torsion angle was 54°. It is thus possible to more efficiently generate vibration in the substrate main body 20 using the drive source 11, and increase the torsion amplitude of the mirror portion 13. In these cases, the overall width of the fixed end 21 may be preferably set to ⅛ to ½ the width of the substrate main body 20.

Moreover, placing a portion of the fixed end 21 in a center portion of the substrate main body 20 makes it possible to cause the mirror portion 13 to vibrate at a large torsion angle. For example, when the position of a portion of the fixed end 21 was not placed in the center of the substrate main body 20, as shown in FIG. 7 (*e*), the torsion angle of the mirror portion 13 was 43°. However, when a portion of the fixed end 21 was also in a position in the center of the substrate main body 20, as shown in FIG. 7 (*d*) (referred to as a spectacle frame shape), the torsion angle of the mirror portion 13 was 54°.

On the other hand, even when the fixed end 21 is the same as the width of the substrate main body 20, by changing the support mode by which the supporting component 16 fixes the fixed end 21 of the substrate main body 20, the fixing stability of the optical scanning device can be further improved.

FIGS. 8(*a*) to 8(*c*) show examples of three support modes.

FIG. 8(*a*) shows an example in which the entire surface of one side of the substrate main body 20 is supported by the supporting component 16. In this case, the torsion angle of the mirror portion 13 was 45°.

FIG. 8(*b*) shows an example in which the entire surface of one side of the substrate main body 20 and both sides continuous with this are supported by the supporting component 16. In this case, the torsion angle of the mirror portion 13 was 43°. Because the vibration generated in the substrate main body 20 by the drive source 11 is not very large in the both-side portions of the substrate main body 20 on the opposite side from the mirror portion 13 side (see FIG. 11), even if the both-side portions of the fixed end 21 are fixed by the supporting component 16, there is substantially no effect on the torsion amplitude of the mirror portion 13. In the case of FIG. 8(*b*), because there is a substantially longer length fixing the substrate 10, in actual use, it is possible to further increase the fixing stability of the optical scanning device. In this case, the angle θ of the triangles cut into the supporting component 16 may be within a range of between 30° and 300° within a plane.

A further method of fixing the substrate 10 to the supporting component 16 is to clamp the substrate main body 20 from above and below so as to provide stable fixing. However, there are cases in which, when the clamped portion is a flat plane, uniform contact pressure is not applied to the fixed end of the substrate main body, so that unnecessary resonance is generated and sufficient fixing cannot be achieved. Thus, as shown in FIG. 8(*c*), if the cross-sectional configuration of the clamped portion is formed as curved, then slight bending tension acts in the vicinity of the fixed end of the substrate main body 20. As a result, uniform pressure is applied to the contact surface between the substrate main body 20 and the supporting component 16, and a more stable fixing is possible by the pressure. In experiments, it was found that when the clamped portion was a plane (flat surface), the torsion angle of the mirror portion 13 was 30°, but in the case of the curved surface as shown in FIG. 8(*c*), the resonance frequency was stabilized and the torsion angle of the mirror portion 13 was able to increase to 54°.

The cross-sectional configuration of the clamped portion is not limited to the above-described curved surface, and may also be a triangular configuration which imparts a slight bend to the substrate main body portion.

The optical scanning device according to the present invention has a basic structure, in which the substrate main body 20, as shown in FIG. 1, is supported in a cantilever fashion by a supporting component 16, on the opposite side from the mirror portion 13. Because of this, if a vertical disturbance vibration is applied to the entire optical scanning device, then the entire optical scanning device vibrates, and optical beams which are reflected and scanned by the mirror portion 13 are affected by this vibration and do not vibrate stably, so that the problem arises that it is not possible to guarantee accurate optical scanning. Accordingly, assuming that the optical scanning device will be used in practical applications, such as in portable devices and the like, it is necessary to improve this instability with the entire optical scanning device having a cantilever structure.

Figure 9:
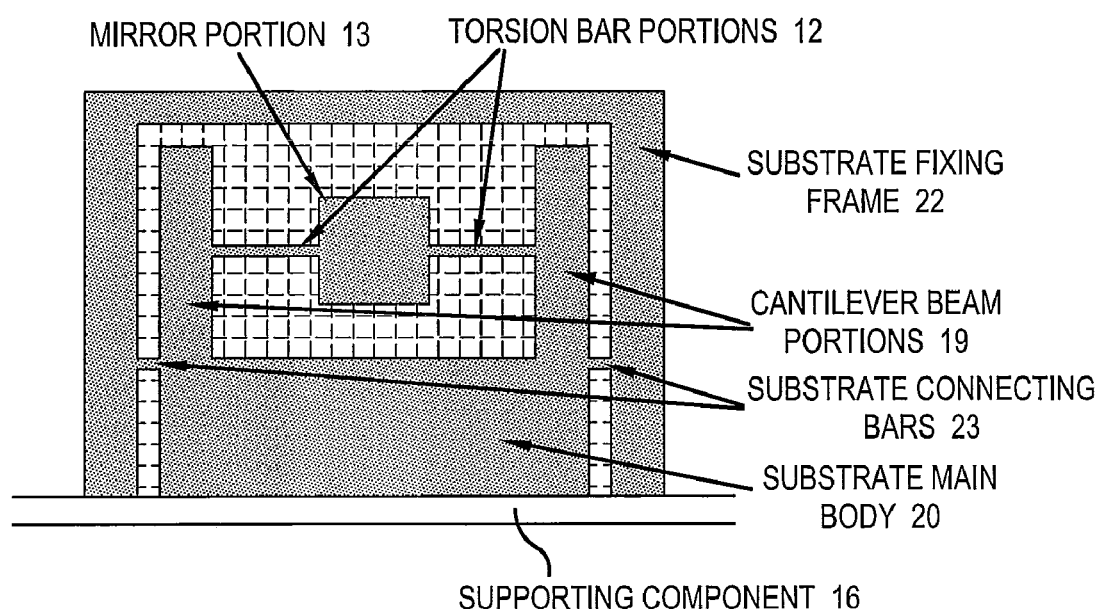
FIG. 9 is a plan view of a device in which a substrate fixing frame is positioned so as to surround the substrate main body and cantilever beam portions on the optical scanner according to the present invention.

Therefore, as shown in FIG. 9, in the present invention, the optical scanning device is fixed by means of narrow-width substrate connecting bars 23 to a rigid substrate fixing frame 22, which is positioned so as to surround the entire cantilever-supported optical scanning device, at positions separated from the fixed end 21 of the optical scanning device.

At this time, the resonance state of the optical scanning device itself changes depending on the fixing positions of the substrate connecting bars 23, and the scan angle and resonance frequency of the mirror portion 13 may also be changed by the influence above.

Figure 10:
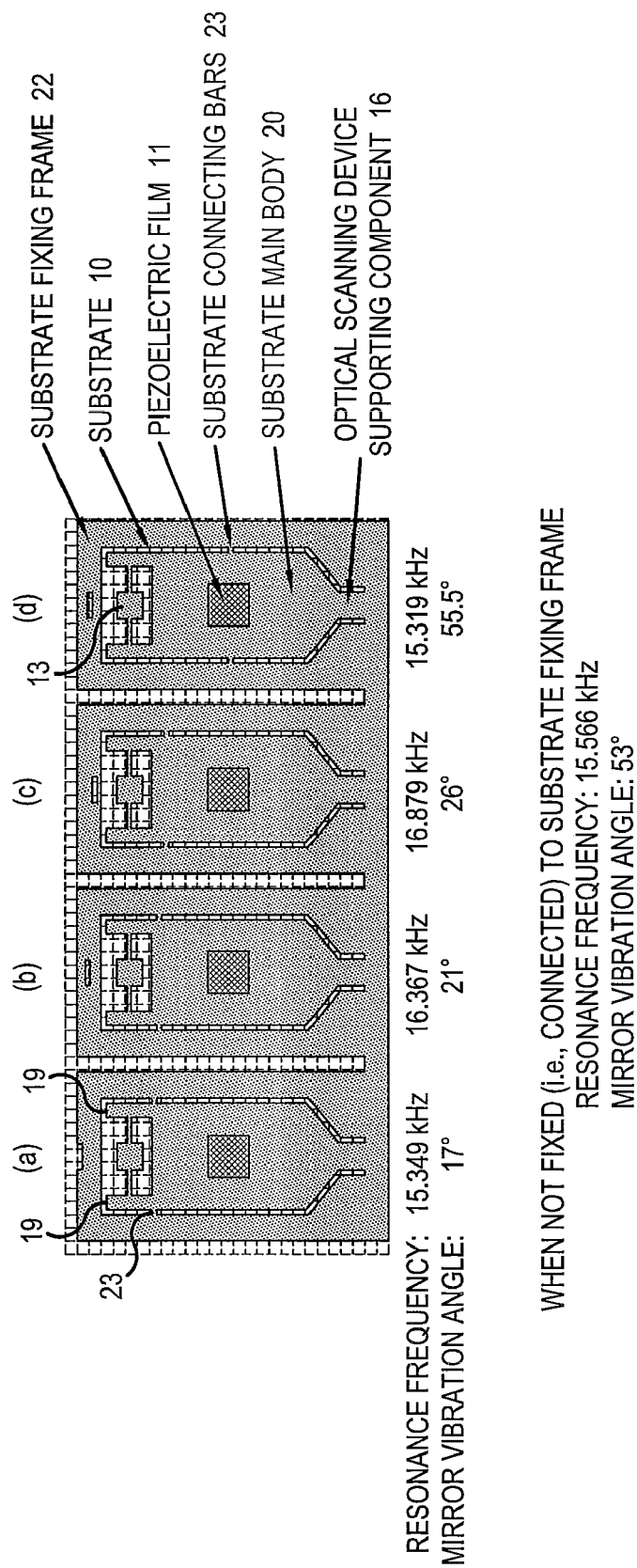
FIGS. 10(a) to 10(d) are views illustrating mirror torsion angles when the position of substrate connecting bars which connect together a substrate and a substrate fixing frame was changed.
Figure 11:
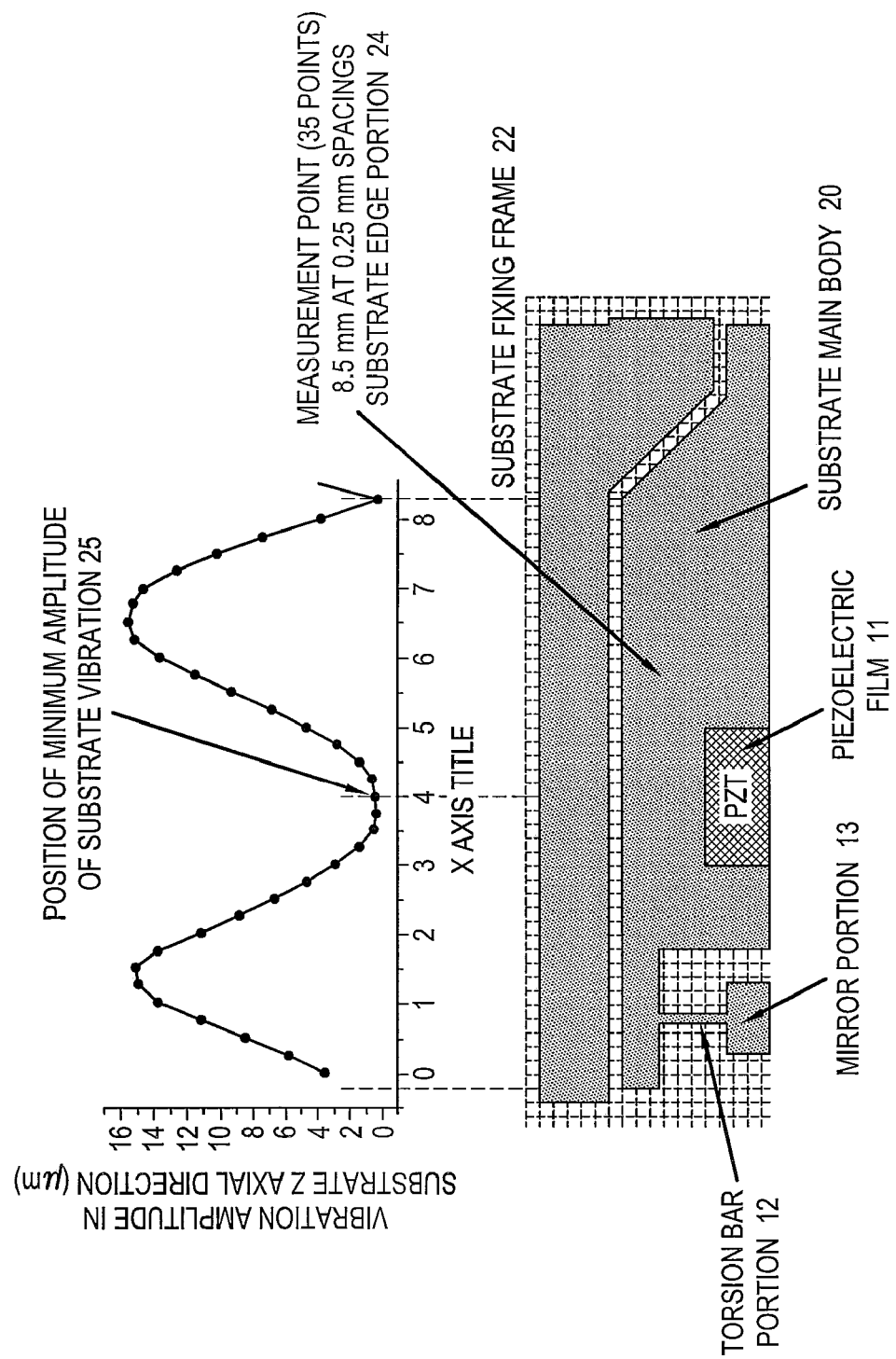
FIG. 11 is a view illustrating a state of the vibration amplitude of an edge portion of a substrate, when the mirror portion is in torsional resonance state when the substrate and the substrate fixing frame are not connected by substrate connecting bars.

FIGS. 10 and 11 show the results when this state was examined. As shown in FIG. 10(*a*), if the optical scanning device is fixed by the substrate connecting bars 23 at the base of cantilever beam portions 19 whose vibration amplitude close to the middle of the vibration is large when the mirror portion 13 is in torsional resonance state, then the scan amplitude of the mirror portion 13 is considerably reduced, namely, by approximately 17°, as compared to a scan amplitude of approximately 53° which is obtained when the optical scanning device is not fixed. This is because if a large portion of the vibration amplitude is fixed at the outer peripheral portion of the optical scanning device so that this vibration is suppressed, then the vibration mode of the entire optical scanning device is changed, which results in it becoming impossible to efficiently transmit energy to the torsional vibration of the mirror portion 13.

Contrary to the above, in the state, as shown in FIG. 11, in which the substrate main body 20 is not connected to the substrate fixing frame 22 by the substrate connecting bars 23, when the mirror portion 13 is in torsional resonance state, if, as shown in FIG. 10(*d*), the optical scanning device is connected and fixed by the substrate connecting bars 23 in a portion in the vicinity of a bottom point 25 where a vibration amplitude in the Z axial direction of the edge portion of the substrate 10 (i.e. a portion indicated by the reference numeral 24 in FIG. 11) is at the minimum, then the scan amplitude of the mirror portion 13 becomes a slightly larger scan amplitude, namely, approximately 55°, than when it is not fixed to the substrate fixing frame 22. In this case, since the vibration mode of the entire optical scanning device is not changed, it is possible to maintain a substantially equivalent resonance state, as compared with that when the optical scanning device is not fixed, and any effects on the scan amplitude of the mirror portion 13 by fixing the substrate 10 by the substrate connecting bars 23 become the minimum.

Accordingly, if the substrate 10 is fixed at the outer edge portion of the optical scanning device, by means of the substrate connecting bars 23 at the bottom point of the vibration when the mirror is resonating, or at the point where the vibration amplitude is the smallest and which is also furthest away from the supporting component 16, then it is possible to stably support the substrate 10 against any external disturbance vibration, without attenuating the scan amplitude of the mirror portion 13.

The scan jitter and the scan wobble (optical face tangle error) (i.e. the stability of the beam scanning speed) of optical beam in the optical scanning device according to the present invention were evaluated by a MEMS scanner measurement system (ALT-9A44) manufactured by ALT Ltd. As a result, it was found that, while a scan jitter of a usual silicon MEMS optical scanner (manufactured by Nippon Signal) was Jp-p: 0.2 to 0.3%, irrespective of the fact that the optical scanning device according to the present invention was formed from a metal material, the scan jitter at scan resonance frequencies of 6 kHz, 16 kHz, and 24 kHz was smaller by a factor of 10, namely, Jp-p: 0.06%. It was thus possible to achieve a high-accuracy optical beam scan corresponding to a usual polygon mirror technology. Moreover, in a usual polygon mirror technology, the scan wobble is approximately Wp-p: 30 to 40 seconds, and it is necessary to apply correction using f-Θ lens or the like and lower the value by a factor of 10. Contrary to the above, in the optical scanning device according to the present invention, the scan wobble is Wp-p: 5 seconds or less, which is a value lower by a factor of 10, so that it is possible to achieve a highly stable beam scanning speed without a correction lens system, so that reductions in both size and costs can be achieved readily. From the above-described measurement results, it is evident that the optical scanning device according to the present invention makes it possible to obtain a favorably high optical-beam scanning accuracy, which can be used in a laser printer and the like.

The present invention is directed to the method of adjusting a resonance frequency which determines a resonance vibration of a mirror portion, by trimming not the mirror portion and the torsion bar portions (the mirror support beam portions) but the substrate including the substrate main body and the cantilever beam portions. The fine adjustment via the trimming can be performed: by reducing an area of the substrate (i.e. the area contributing the vibration of the mirror portion) which protrudes from the fixed end, at which the substrate main body is attached to the supporting component, to an outside of the supporting component, thereby to increase the resonance frequency; or by increasing an area of the substrate (i.e. the area contributing the vibration of the mirror portion) which protrudes from the fixed end, at which the substrate main body is attached to the supporting component, to an outside of the supporting component, thereby to decrease the resonance frequency.

Hereinafter, the method of the present invention for finely adjusting the resonance frequency of the optical scanning device, is described in more detail based on some embodiments, with reference to the attached drawings, but the invention is not limited to those. The same reference numerals are given to the same parts/elements in the drawings.

EXAMPLES

Example 1

FIGS. 12(a) to 12(c) are explanatory views each illustrating a method of finely adjusting a resonance frequency by adjusting a lateral width of a substrate, according to an embodiment of the present invention.

In FIGS. 12(a) to 12(c), a plurality of holes are provided in a substrate 10 including a substrate main body 20 and two cantilever beam portions 19. The holes have an effect of reducing noises caused when the substrate is vibrated by a drive source. In view of the fine adjustment of the resonance frequency, the holes are not necessarily provided. When the substrate is partially cut and the holes are used for the fine adjustment, there is an advantage that cutting may be readily performed.

As illustrated in FIG. 12(a), the substrate resonated at a resonance frequency of 2.909 kHz and a torsion angle of 72 degrees with a drive voltage 60 V of the drive source. As illustrated in FIG. 12(b), by cutting external side portions of the substrate main body 20 and external side portions of the two cantilever beam portions 19 by two hole columns to narrow a lateral width of the substrate 10, the resonance frequency slightly increased to 2.975 kHz at the same drive voltage of 60 V (torsion angle was 72 degrees). As illustrated in FIG. 12(c), when one more hole column was further cut to narrow the lateral width of the substrate 10, the resonance frequency slightly increased to 3.034 kHz at the same drive voltage of 60 V (torsion angle was 64 degrees).

As described above, when the external side portions of the substrate main body 20 and the external side portions of the cantilever beam portions 19 are partially cut to narrow the lateral width of the substrate 10, an area of the substrate 10 which protrudes from the fixed end 21 to the outside of the supporting component 16 can be reduced, thereby to increase the resonance frequency by a small amount. Therefore, this may be used to realize the method of finely adjusting the resonance frequency.

Example 2

FIGS. 13(a) and 13(b) are explanatory views illustrating a fine adjustment method according to another embodiment of the present invention. In the fine adjustment method, the fixed end of the substrate main body which is opposed to the mirror portion side thereof is fixed to the supporting component at a fixing position in an adjustable manner. A protruding length of the substrate from the fixed end is lengthened, to increase the area of the substrate which protrudes from the fixed end to the outside of the supporting component, to thereby reduce the resonance frequency by a small amount. Alternatively, the protruding length of the substrate from the fixed end is shortened, to reduce the area of the substrate which protrudes from the fixed end to the outside of the supporting component, to thereby increase the resonance frequency by a small amount.

FIG. 13(a) is identical to FIG. 12(c). The drive voltage is 60 V and the resonance frequency is 3.034 kHz (torsion angle is 64 degrees). As illustrated in FIG. 13(b), the fixed end 21 of the substrate main body 20 which is opposed to the mirror portion side thereof is fixed to the supporting component 16 at an adjusted fixing position. In FIG. 13(b), when the position of the fixed end 21 is shifted downward to lengthen the protruding length of the substrate 10 protruding from the fixed end 21, the resonance frequency slightly reduces to 2.962 kHz at the same drive voltage of 60 V (torsion angle is 74 degrees).

In other words, when the position of the fixed end is shifted upwardly as shown in FIG. 13(a) (which means to decrease the area of the substrate protruding from the fixed end to the outside of the supporting component), the resonance frequency is increased. In contrast to this, when the position of the fixed end is shifted downwardly as shown in FIG. 13(b) (which means to increase the area of the substrate protruding from the fixed end to the outside of the supporting component), the resonance frequency is decreased.

As described above, when the protruding length of the substrate protruding from the fixed end is lengthened, the area of the substrate which protrudes from the fixed end to the outside of the supporting component can be increased, thereby to reduce the resonance frequency by a small amount. In contrast to this, when the protruding length of the substrate protruding from the fixed end is shortened, the area of the substrate which protrudes from the fixed end to the outside of the supporting component can be reduced, thereby to increase the resonance frequency by a small amount. Therefore, this may be used to realize the method of finely adjusting the resonance frequency.

The method according to Example 2 may be used alone or in combination with the method according to Example 1. In FIGS. 13(a) and 13(b), a plurality of holes are provided in the substrate. This is because the holes have an effect of reducing noises caused when the substrate is vibrated by the drive source, as described in Example 1.

Example 3

FIGS. 14(a) to 14(c) are explanatory views illustrating a fine adjustment method according to still another embodiment of the present invention. In the fine adjustment method, additional frames 26 are provided in the external side portions of the substrate main body 20. External side portions of the additional frames 26 are partially cut, to reduce the sum total of the area of the substrate 10 which protrudes from the fixed end 21 to the outside of the supporting component 16 and the area of the additional frames 26, to thereby increase the resonance frequency by a small amount.

As illustrated in FIG. 14(a), the additional frames 26 are provided in the external side portions of the substrate main body 20. In FIGS. 14(a) to 14(c), a plurality of holes 27 (see FIG. 14(c)) are provided as columns in the substrate 10 and the additional frames 26. As described in Examples 1 and 2, the holes 27 have an effect of reducing noises caused when the substrate 10 and the additional frames 26 are vibrated by the drive source 11. When the holes 27 are used to cut the additional frames 26, the cutting operation is facilitated. In FIGS. 14(a) to 14(c), the additional frames 26 correspond to three hole columns of the holes 27.

In the case illustrated in FIG. 14(a), the drive voltage is 60 V and the resonance frequency is 2.993 kHz (torsion angle is 76 degrees). FIG. 14(b) illustrates a case where first and second hole columns are cut from the additional frames 26 corresponding to three hole columns. As illustrated FIG. 14(c), when the first hole column of the additional frame 26 is cut, the resonance frequency slightly increases to 3.013 kHz at the same drive voltage of 60 V (torsion angle is 76 degrees). Then, when the second hole column of the additional frame 26 is further cut, the resonance frequency slightly increases to 3.049 kHz at the same drive voltage of 60 V (torsion angle is 73 degrees). Then, when the third hole column of the additional frame 26 is further cut, the resonance frequency slightly increases to 3.071 kHz at the same drive voltage of 60 V (torsion angle is 73 degrees).

As described above, the additional frames 26 are provided in the external side portions of the substrate main body 20. When the external side portions of the additional frames 26 are partially cut, the total of the area of the substrate 10 which protrudes from the fixed end 21 to the outside of the supporting component 16 and the area of the additional frames 26 can be reduced, thereby to increase the resonance frequency by a small amount. Therefore, this may be used to realize the method of finely adjusting the resonance frequency.

Modified Example of Example 3

Figure 15A:
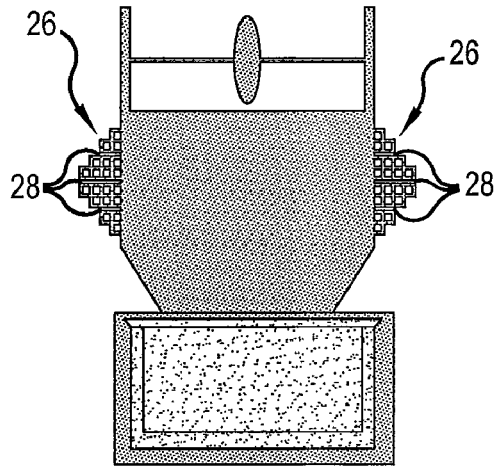
FIGS. 15(a) to 15(c) are explanatory views illustrating adjustment methods of providing slits to the additional frames, in the embodiment illustrated in FIG. 14.
Figure 15B:
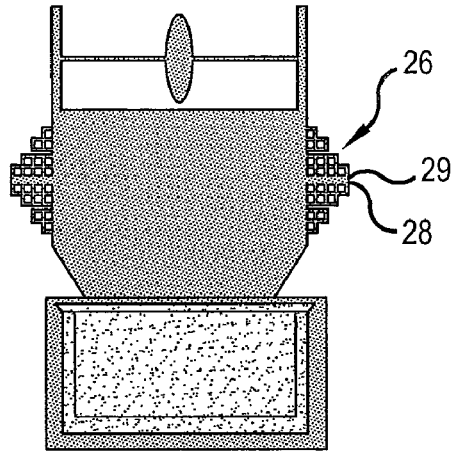
Figure 15C:
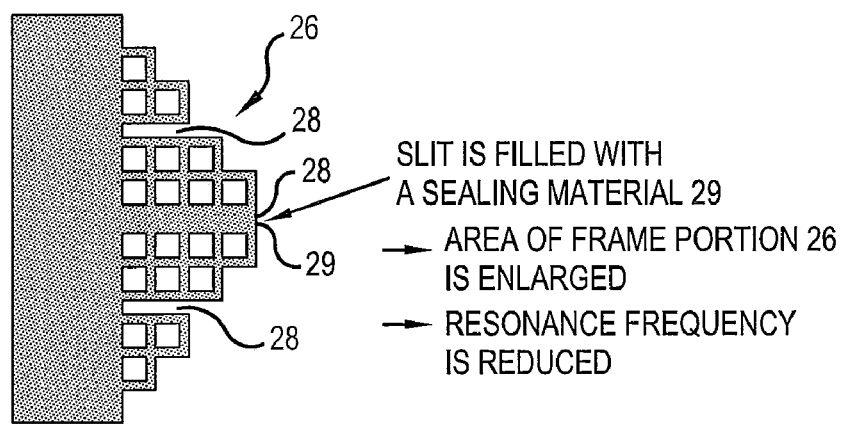
Figure 17:
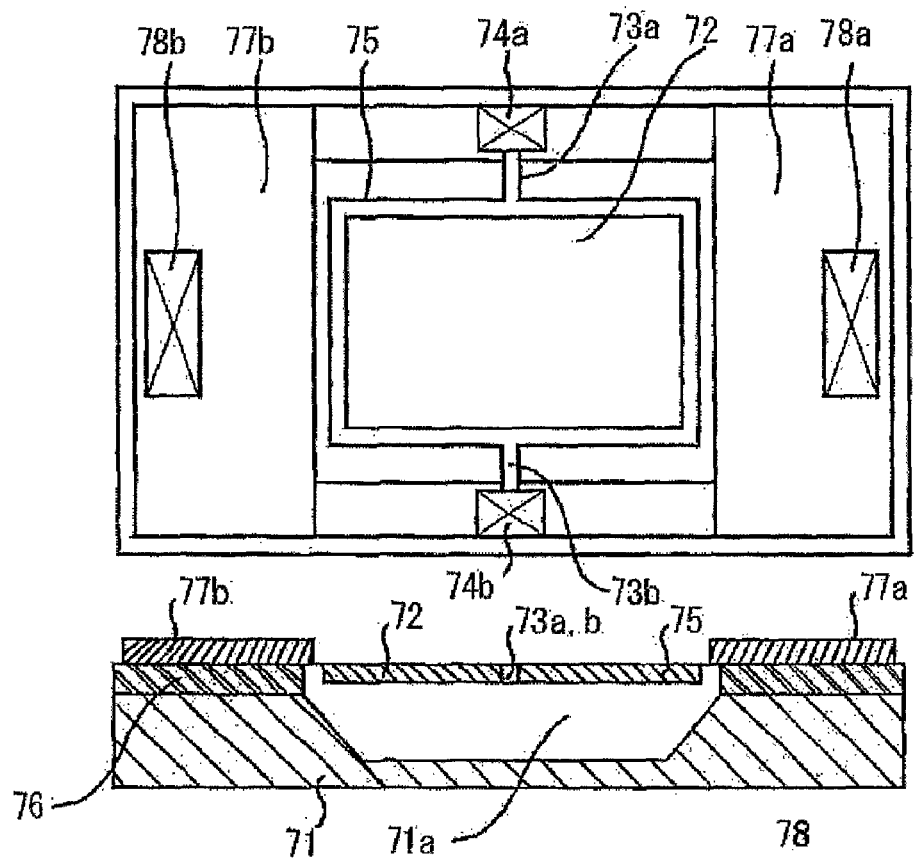
FIG. 17 is a view showing the optical scanner as described in Patent document 1, with the upper figure in FIG. 17 being a plan view and the lower figure in FIG. 17 being a frontal cross-sectional view thereof.
Figure 18:
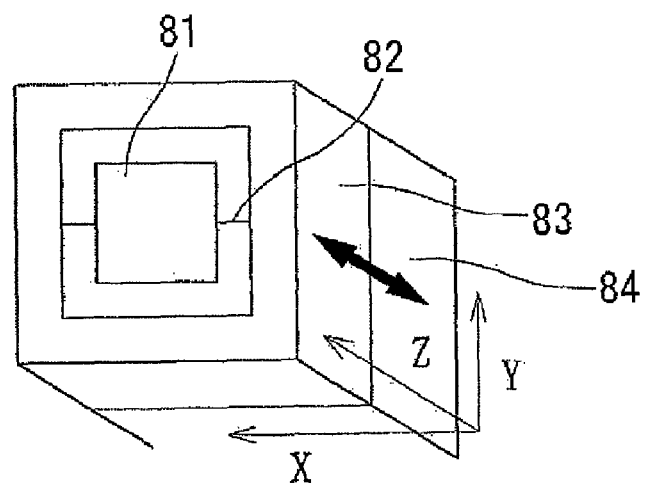
FIG. 18 is a perspective view showing the optical scanner as described in Patent document 2.

FIGS. 15(a) to 15(c) are explanatory views illustrating a modified example of the fine adjustment method according to Example 3. As illustrated in FIGS. 15(a), 15(b), and 15(c) which is a partially enlarged view of FIG. 15(b), slits 28 are provided in the additional frames 26. As illustrated in FIG. 15(b), when the slits 28 are sealed or filled with a sealing material 29, e.g. a bonding material, the total of the area of the substrate 10 which protrudes from the fixed end 21 to the outside of the supporting component 16 and the area of the additional frames 26 is increased, to reduce the resonance frequency by a small amount.

In FIGS. 15(a) to 15(c), the plurality of slits 28 are provided in each of the frames 26, but a single slit may be provided.

Another Modified Example of Example 3

FIGS. 16(a) to 16(c) illustrate another modified example of Example 3. FIGS. 16(a) to 16(c) illustrate that, when mounting positions of the additional frames 26 are set so that a distance between the face center of the additional frames 26 formed on both sides and the fixed end 21 would be equal to a distance between the face center of the drive source 11 and the fixed end 21, a reduction in torsion angle which is caused by providing the additional frames 26 may be minimized. Herein, the term "distance" means the length of a vertical line (i.e. a normal) from the face center (e.g. of the additional frame) to the line extending the fixed end, and the same may be applied hereinabove and hereinafter.

As shown in FIG. 16(a), when the additional frames 26 are provided closer to the cantilever beam portion 19 side (upper side) than the drive source 11, the torsion angle is 63 degrees at the driving voltage of 60 V (resonance frequency is 3.333 kHz). FIG. 16(b) shows the case where the additional frames 26 are provided in the same position as the drive source 11 (PZT piezoelectric body), that is, the additional frames 26 are provided (in the middle region) so that the distance between each of the face centers of the additional frames 26 formed on the respective side and the fixed end 21 is equal to the distance between the face center of the drive source 11 and the fixed end 21. In this case, the torsion angle is 72 degrees at the same driving voltage of 60 V (resonance frequency is 3.425 kHz). As shown in FIG. 16(c), when the additional frames 26 are provided closer to the fixed end 21 side (lower side) than the drive source 11, the torsion angle is 40 degrees at the same driving voltage of 60 V (resonance frequency is 3.453 kHz).

As is apparent from the above, when the additional frames 26 are provided in the same position as the drive source 11 (PZT piezoelectric body), that is, when the additional frames 26 are provided so that the distance between the face center of the additional frames 26 and the fixed end 21 is equal to the distance between the face center of the drive source 11 and the fixed end 21, the reduction in torsion angle which is caused by providing the additional frames 26 may be minimized, which is preferable.

According to the method of the present invention, the resonance frequency may be finely adjusted, by trimming not the mirror portion and the torsion bar portions but the substrate, and hence the trimming operation may be simply and readily performed. Similarly, the method of the present invention may be applied to any device as long as a substrate that is made to vibrate is utilized.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119(a) on Patent Application No. 2009-156531 filed in Japan on Jul. 1, 2009, which is entirely herein incorporated by reference.

What we claim is:

1. A method of adjusting a resonance frequency in an optical scanning device, comprising the steps of:
providing the optical scanning device comprising:
a substrate comprising:
a substrate main body; and
two cantilever beam portions protruding from one side of the respective side portion of the substrate main body;
a drive source positioned in a portion of the substrate main body, for vibrating the substrate;
a mirror portion which is positioned between the two cantilever beam portions, supported at both sides by mirror support beam portions, and vibrated by resonance vibration at a resonance frequency by the vibration of the substrate;
a light source for emitting light to the mirror portion, to change a direction of reflection light by the resonance vibration; and
a supporting component for fixing the substrate main body at a fixed end on an opposite side of the two cantilever beam portions; and
reducing an area of the substrate which protrudes from the fixed end, at which the substrate main body is attached to the supporting component, to an outside of the supporting component, thereby to increase the resonance frequency; or alternatively, increasing the area of the substrate which protrudes from the fixed end, at which the substrate main body is attached to the supporting component, to the outside of the supporting component, thereby to reduce the resonance frequency.

2. The method of adjusting a resonance frequency in an optical scanning device according to claim 1, wherein the substrate has been attached to the supporting component to adjustably set a protruding length of the substrate main body protruding from the fixed end to the outside of the supporting component, and wherein the protruding length is lengthened, and the area of the substrate which protrudes from the fixed end, at which the substrate main body is attached to the supporting component, to the outside of the supporting component is increased, thereby to reduce the resonance frequency; or alternatively, the protruding length is shortened, and the area of the substrate which protrudes from the fixed end, at which the substrate main body is attached to the supporting component, to the outside of the supporting component is reduced, thereby to increase the resonance frequency.

3. The method of adjusting a resonance frequency in an optical scanning device according to claim 1, further comprising:

partially cutting an external side portion of the substrate main body and external side portions of the two cantilever beam portions, to narrow a lateral width of the substrate, so that an area of the substrate which protrudes from the fixed end, at which the substrate main body is attached to the supporting component, to the outside of the supporting component is reduced, thereby to increase the resonance frequency.

4. The method of adjusting a resonance frequency in an optical scanning device according to claim 3, wherein the substrate has been attached to the supporting component to adjustably set a protruding length of the substrate main body protruding from the fixed end to the outside of the supporting component, and wherein the protruding length is lengthened, and the area of the substrate which protrudes from the fixed end, at which the substrate main body is attached to the supporting component, to the outside of the supporting component is increased, thereby to reduce the resonance frequency; or alternatively, the protruding length is shortened, and the area of the substrate which protrudes from the fixed end, at which the substrate main body is attached to the supporting component, to the outside of the supporting component is reduced, thereby to increase the resonance frequency.

5. The method of adjusting a resonance frequency in an optical scanning device according to claim 3, wherein each of the external side portions of the substrate main body and the external side portions of the two cantilever beam portions are provided with a plurality of holes in at least a part thereof, and wherein the partially cutting is performed along a line passing through at least one of the plurality of holes.

6. The method of adjusting a resonance frequency in an optical scanning device according to claim 5, wherein the substrate has been attached to the supporting component to adjustably set a protruding length of the substrate main body protruding from the fixed end to the outside of the supporting component, and wherein the protruding length is lengthened, and the area of the substrate which protrudes from the fixed end, at which the substrate main body is attached to the supporting component, to the outside of the supporting component is increased, thereby to reduce the resonance frequency; or alternatively, the protruding length is shortened, and the area of the substrate which protrudes from the fixed end, at which the substrate main body is attached to the supporting component, to the outside of the supporting component is reduced, thereby to increase the resonance frequency.

7. A method of adjusting a resonance frequency in an optical scanning device, comprising the steps of:

providing the optical scanning device comprising:
  a substrate comprising:
    a substrate main body; and
    two cantilever beam portions protruding from one side of the respective side portion of the substrate main body;
  a drive source positioned in a portion of the substrate main body, for vibrating the substrate;
  a mirror portion which is positioned between the two cantilever beam portions, supported at both sides by mirror support beam portions, and vibrated by resonance vibration at a resonance frequency by the vibration of the substrate;
  a light source for emitting light to the mirror portion, to change a direction of reflection light by the resonance vibration; and
  a supporting component for fixing the substrate main body at a fixed end on an opposite side of the two cantilever beam portions;

providing additional frames to the substrate in an external side portion of the substrate; and partially cutting external side portions of the additional frames, to reduce a sum total of an area of the substrate which protrudes from the fixed end, at which the substrate main body is attached to the supporting component, to an outside of the supporting component, and an area of the additional frames, thereby to increase the resonance frequency; or alternatively, increasing the area of the substrate which protrudes from the fixed end, at which the substrate main body is attached to the supporting component, to the outside of the supporting component, thereby to reduce the resonance frequency.

8. The method of adjusting a resonance frequency in an optical scanning device according to claim 7, wherein the additional frames are positioned on the substrate main body, so that a length of a vertical line from a face center of the additional frames to a line extending the fixed end would be equal to a length of a vertical line from a face center of the drive source to a line extending the fixed end.

9. The method of adjusting a resonance frequency in an optical scanning device according to claim 7, wherein the additional frames are provided with a plurality of holes, and wherein the partially cutting is performed along a line passing through at least one of the plurality of holes.

10. The method of adjusting a resonance frequency in an optical scanning device according to claim 9, wherein the additional frames are positioned on the substrate main body, so that a length of a vertical line from a face center of the additional frames to a line extending the fixed end would be equal to a length of a vertical line from a face center of the drive source to a line extending the fixed end.

11. The method of adjusting a resonance frequency in an optical scanning device according to claim 9, wherein the additional frames have at least one slit which is sealable with a sealing material; and wherein the at least one slit is sealed with the sealing material, to increase the sum total of the area of the substrate which protrudes from the fixed end, at which the substrate main body is attached to the supporting component, to the outside of the supporting component, and the area of the additional frames, thereby to reduce the resonance frequency.

12. The method of adjusting a resonance frequency in an optical scanning device according to claim 11, wherein the additional frames are positioned on the substrate main body, so that a length of a vertical line from a face center of the additional frames to a line extending the fixed end would be equal to a length of a vertical line from a face center of the drive source to a line extending the fixed end.

13. The method of adjusting a resonance frequency in an optical scanning device according to claim 7, wherein the additional frames have at least one slit which is sealable with a sealing material; and wherein the at least one slit is sealed with the sealing material, to increase the sum total of the area of the substrate which protrudes from the fixed end, at which the substrate main body is attached to the supporting component, to the outside of the supporting component, and the area of the additional frames, thereby to reduce the resonance frequency.

14. The method of adjusting a resonance frequency in an optical scanning device according to claim 13, wherein the additional frames are positioned on the substrate main body, so that a length of a vertical line from a face center of the additional frames to a line extending the fixed end would be equal to a length of a vertical line from a face center of the drive source to a line extending the fixed end.

* * * * *